United States Patent [19]

Woods et al.

[11] 4,349,874
[45] Sep. 14, 1982

[54] BUFFER SYSTEM FOR SUPPLY PROCEDURE WORDS TO A CENTRAL PROCESSOR UNIT

[75] Inventors: William E. Woods, Natick; Philip E. Stanley, Westboro; David E. Cushing, Chelmsford; Richard A. Lemay, Carlisle, all of Mass.

[73] Assignee: Honeywell Information Systems Inc., Waltham, Mass.

[21] Appl. No.: 140,630

[22] Filed: Apr. 15, 1980

[51] Int. Cl.³ .................. G06F 3/00; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,766,532 | 10/1973 | Liebel, Jr. | 364/200 |
| 3,839,705 | 10/1974 | Davis et al. | 364/200 |
| 4,161,024 | 7/1979 | Joyce et al. | 364/200 |
| 4,168,523 | 9/1979 | Chari et al. | 364/200 |
| 4,195,343 | 3/1980 | Joyce | 364/200 |

Primary Examiner—Harvey E. Springborn
Attorney, Agent, or Firm—John S. Solakian; Nicholas Prasinos

[57] ABSTRACT

In a data processing system, a central processor unit requests procedural data words or non-procedural data words stored in the system memory. A control store device executes firmware instructions including a local bus field for controlling the transfer of the requested procedural data words and non-procedural data words to the central processor unit. The requested procedural data words and non-procedural data words are transferred to the central processing unit by an interfacing device including a data bus latch for receiving the procedural data words and non-procedural data words transferred from the memory, a prefetch buffer for storing up to four words, a first set of OR gate circuits for selectively transferring the procedural data words stored in the prefetch buffer to a procedural data multiplexer for assembling either a procedural data word or a procedure address, and a second set of OR gate circuits for selectively transferring either a procedural data word or non-procedural data word to the source bus or a procedural data address or non-procedural data address to the source bus for transfer to the central processor unit.

11 Claims, 25 Drawing Figures

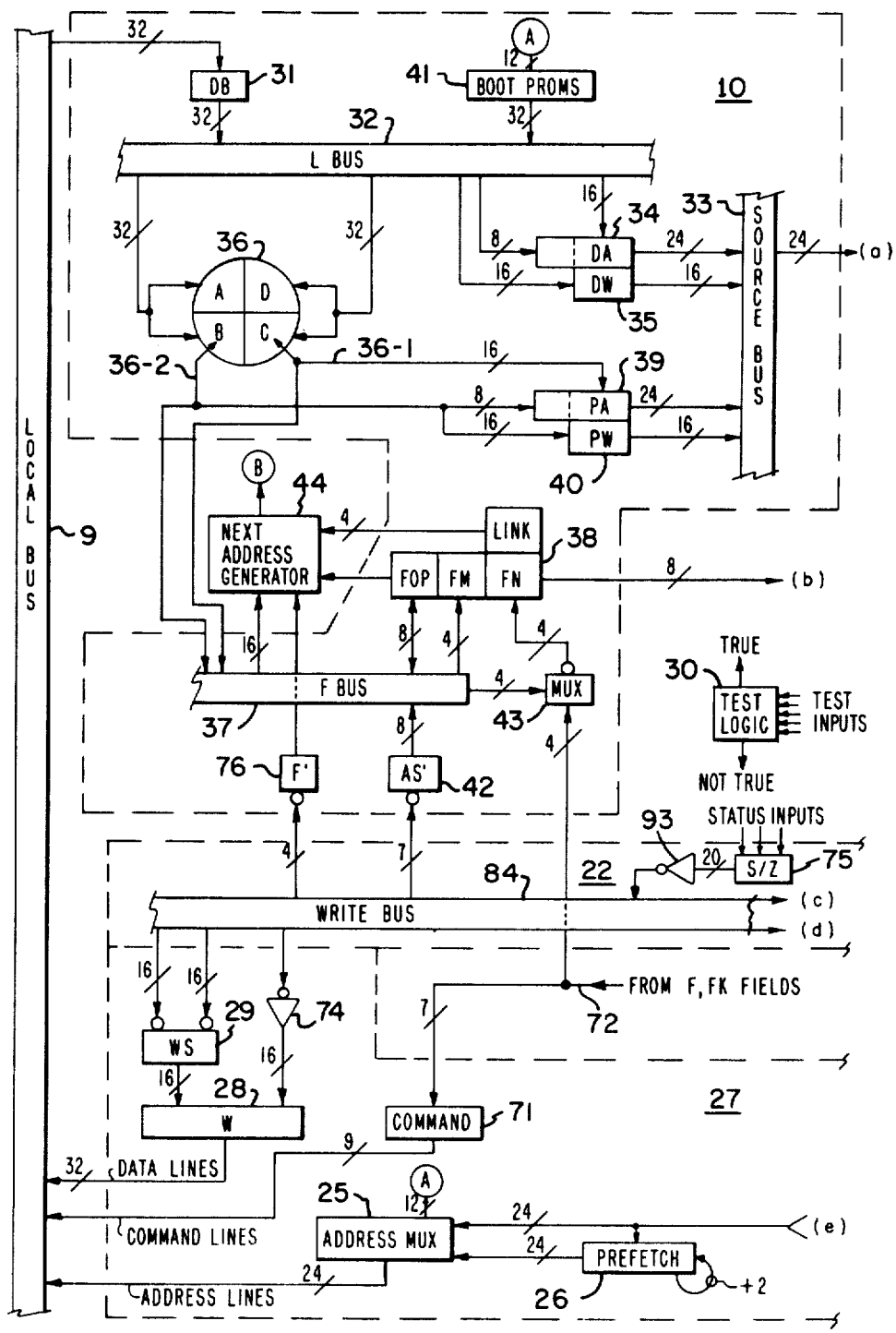
FIG. 2 (SHEET 1 OF 2)

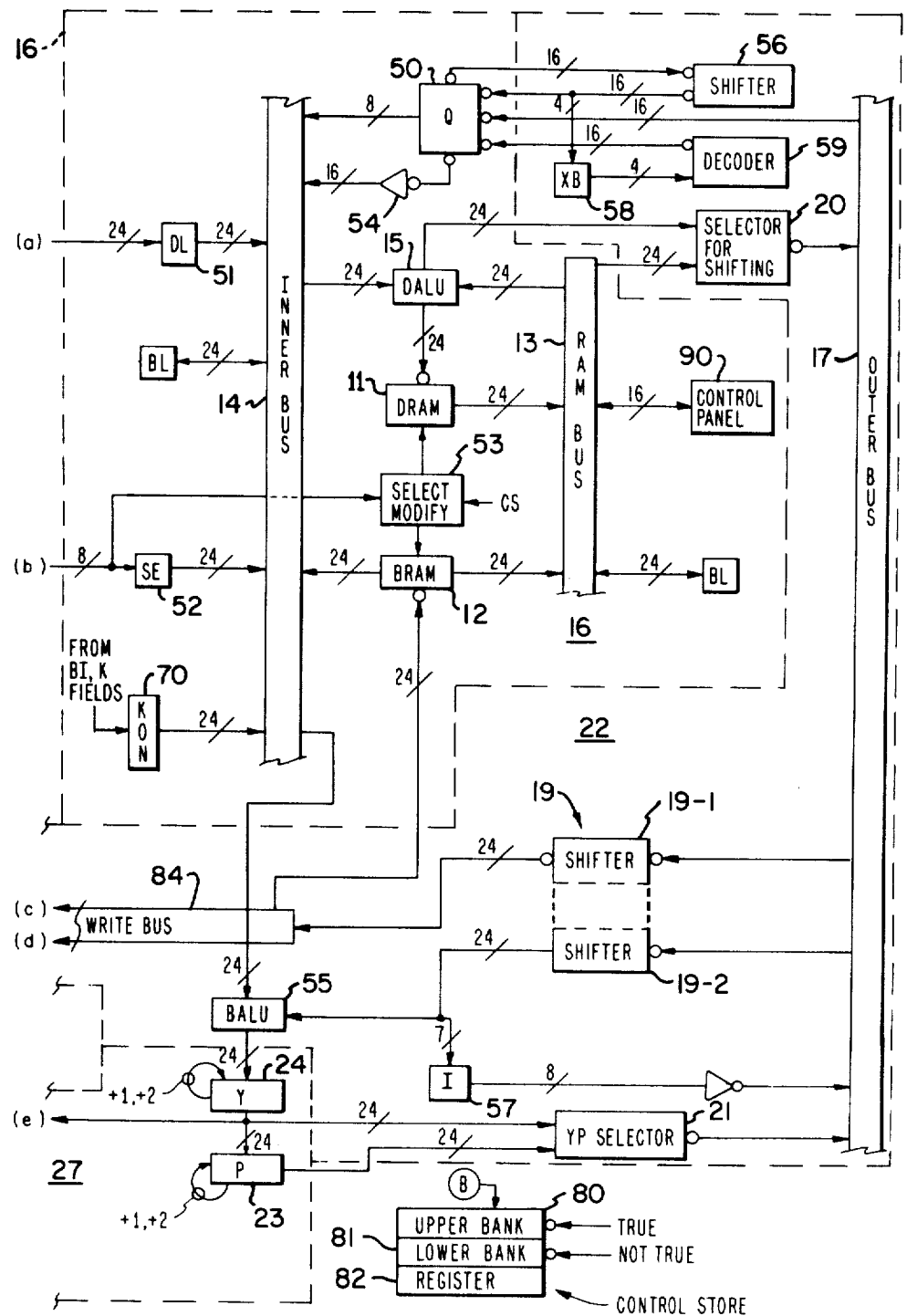
FIG. 2  SHEET 2 OF 2

|    | LOWER BANK | UPPER BANK |
|----|------------|------------|
| X0 | NA(1-10)   | NA(1-9),NA(A) |
| X1 | NA(1-10)   | NA(1-9),NA($\overline{A}$) |
| XA | NA(1-10)   | NA(1,2),XA PROMS(5)(3-10) |
| XB | NA(1-10)   | NA(1,2),110,F(12),XB PROM(1)(7-10) |
| XR | NA(1-10)   | NA(1,2),000,CF=(KOP),XR PROM(1)(7-10) |
| XE | NA(1-10)   | NA(1,2),KOP,F(0),#=0,F(4-8)(6-10) |
| XW | NA(1-10)   | NA(1,2),0,0D SIZ PROM(1)(4-6), 1,0D/ADDR. PROM(8), XW PROM(9,10) |
| XL | NA(1-10)   | NA(1-6), LINK(7-10) |

FIG. 6

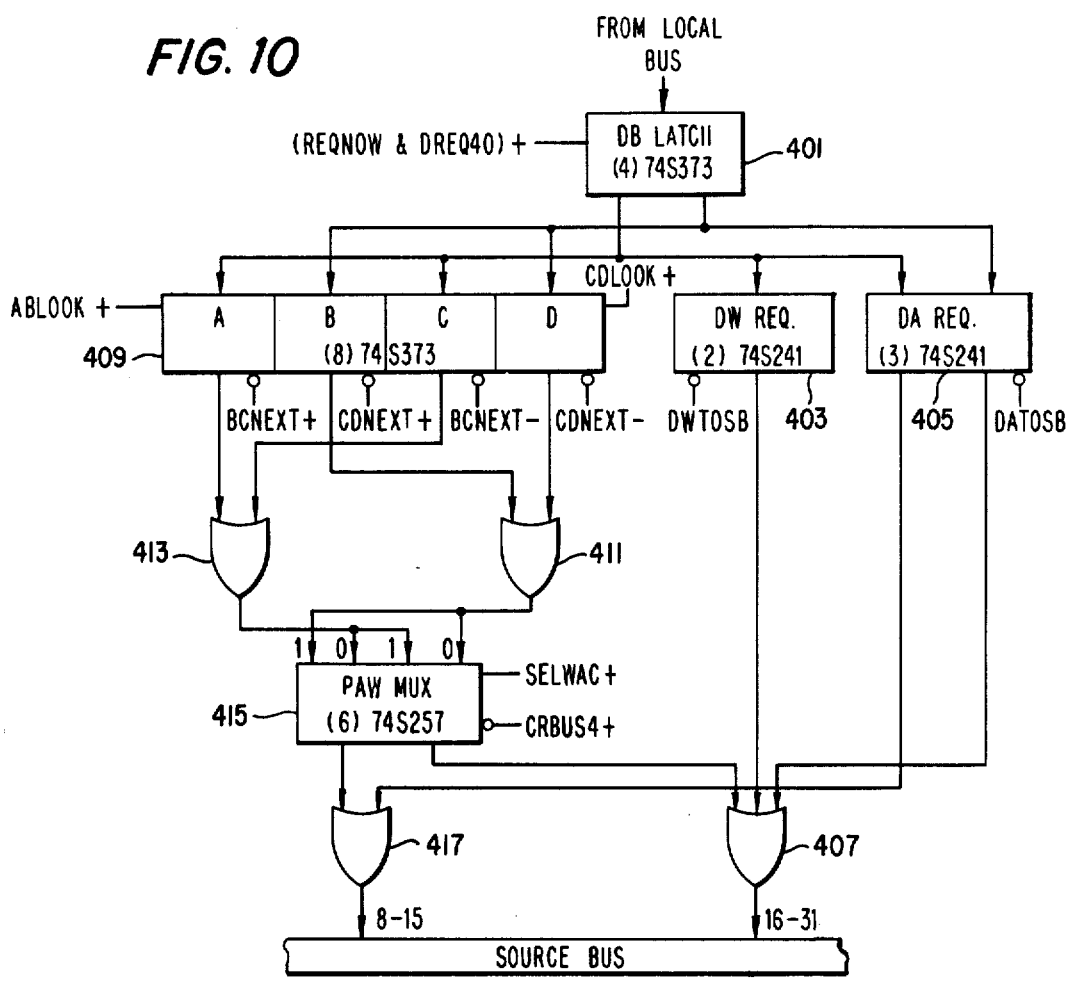

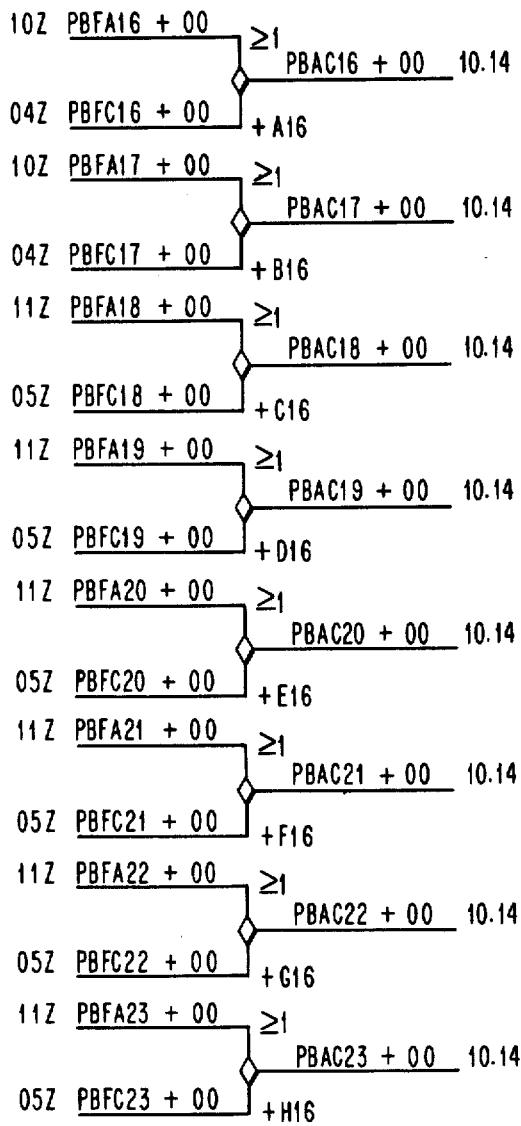
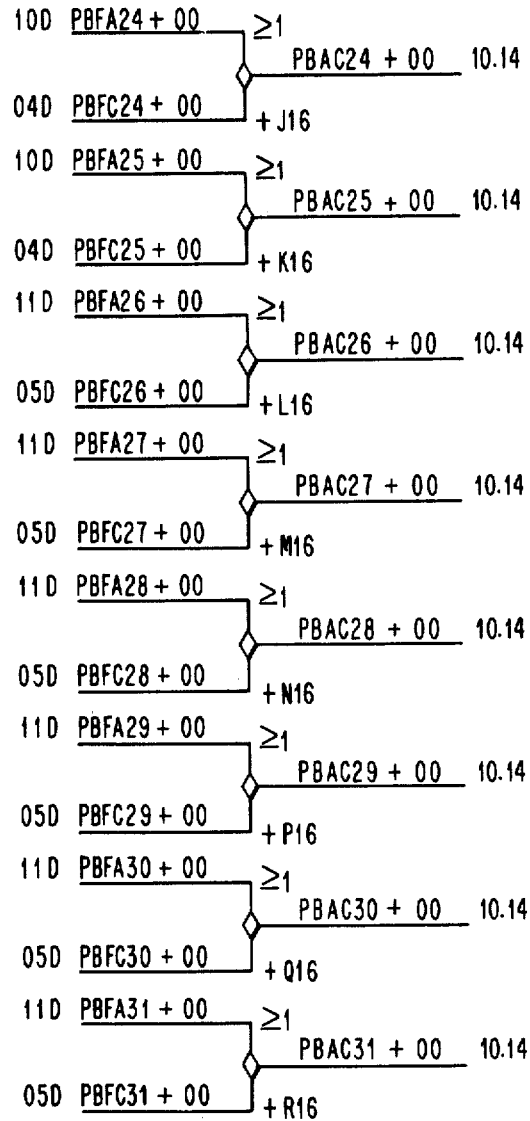
FIG. 14
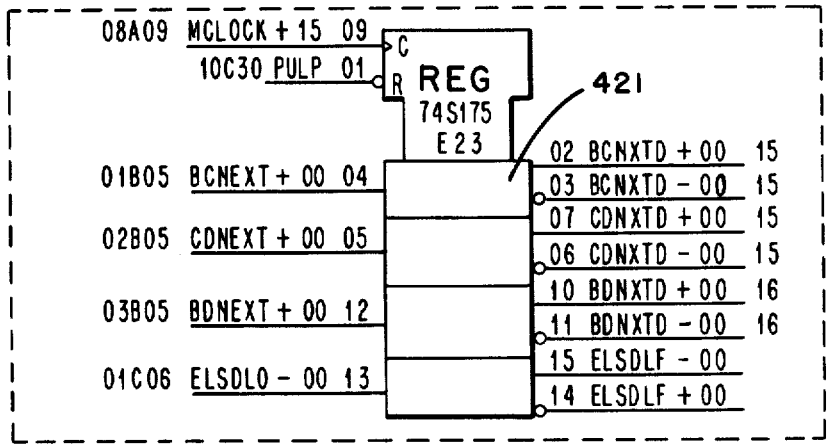
FIG. 21

BUFFER SYSTEM FOR SUPPLY PROCEDURE WORDS TO A CENTRAL PROCESSOR UNIT

FIELD OF THE INVENTION

This invention relates with particularity to an apparatus for interfacing the system and cache memories of a data processing system with a processor unit by transferring procedural data and non-procedural data stored in the memories to the processor unit in response to a processor unit request for such data.

BACKGROUND OF THE INVENTION

Within the data processing industry, there has been much effort directed to increasing the performance of a computer system while at the same time decreasing the overall cost of the system. Among the many variables to be considered in increasing the performance of a data processing system, two very important considerations are the speed of the processor unit or units employed within the computer system and the facility with which data can be transferred from the system memory to the processor unit.

One prior art approach to increasing the performance of a data processing system was to provide a plurality of processor units each connected to the system memory over a common data bus. As an extension of this approach, individual processor units were specifically designed to perform certain types of processor operations very efficiently. Thus, the data processing system might have included a high-speed scientific processor unit specially adapted to perform mathematical calculations at extremely high speeds, a commercial instruction processor unit specially designed to run efficiently operations common in business-related data processing, and a more generalized central processor unit serving as a sort of master processor unit, ultimately controlling the operation of the entire data processing system and also providing additional processing capability.

It is common in such multiple processor data processing systems for each processor to communicate with the system memory through individual couplings to a common data bus. This configuration has significantly increased the processing efficiency of the data processing system and has resulted in a degree of success in increasing the overall performance of the system.

A second approach to maximizing data processing system performance has been to minimize the number of times a processor unit had to access the system memory in order to obtain data stored therein. This approach contemplates the use of a very high speed memory of limited storage capacity called a cache memory. The information most recently requested by the central processor unit is transferred from the systems memory to the cache memory so that subsequent requests for such information results in a transfer directly between the cache and the processing unit withot any need for accessing the slower system memory.

A third approach to increasing the performance of a data processing system has been to employ a hybrid of the first and second approaches and contemplates providing multiple specialized processor unit within the data processor system and employing a cache memory for the controlling processor, e.g., the CPU, among the variety of processors. To a degree, this further increases the performance of the data processing system since the CPU is required to access the system memory fewer times because of the provision of the cache memory and, therefore, the other processor units experience a decrease in the traffic on the data bus with the end result that transfer time from the system memory to the other processor units is reduced.

OBJECTS AND SUMMARY OF THE INVENTION

It is accordingly an object of the present invention to further increase the performance of a data processing system without a significant increase in the cost of the system.

Another object of this invention is to provide an improved interfacing apparatus for coupling a processor unit to the cache and system memories of a data processing system.

Yet another object of this invention is to provide an interfacing apparatus for tranferring procedural and non-procedural data from a cache memory or system memory to a processor unit in response to a request for such data by the processor unit.

A further object of this invention is to provide an interfacing apparatus wherein procedural data words and non-procedural data words are separately transferred from a cache memory and a system memory to a processor unit.

A further object of this invention is to provide an interfacing apparatus wherein a plurality of procedural data words are stored in advance of their transfer to a processor unit to reduce the amount of time a processor unit is required to wait for requested procedural data words.

Additional objects and advantages of the invention will be set forth in part in the description which follows, and in part will be apparent from the description or may be learned from the practice of the invention. The objects and advantages of the invention may be realized and obtained by means of the instrumentalities and combinations particularly pointed out in the appended claims.

To achieve the foregoing objects in accordance with the invention, as embodied and broadly described herein, an interfacing system for controlling the transfer of procedural data words and non-procedural data words from a systems memory to a processor unit in response to a request by the processor unit for the procedural data words and the non-procedural data words comprises: a buffer apparatus for receiving the procedural data wordss and the non-procedural data words transferred from the memory in response to a processor request; means coupled to the receiving a store storing the received procedural data words separately from the received non-procedural data words; and a transferring apparatus selectively transferring to the processor unit the procedural data words and the non-procedural data words stored in the storing means.

Preferably, the buffer apparatus comprises a data latch circuit for receiving procedural data words, procedural data addresses, non-procedural data words, and non-procedural data addresses from the system memory via a system bus. The store may comprise a data word buffer for storing a non-procedural data word, a data bus address buffer for storing a non-procedural data address, a plurality of data storage cells, each of the data storage cells for storing a different procedural data word, a procedural data multiplexer for receiving one or more of the procedural data words stored in the storage cells, an OR gate circuit for selectively transferring procedural data words from the storage cells to the procedural data multiplexer, and circuitry for controlling the transfer of the procedural data words and non-procedural data words from the data latch to the data word buffer, the data address buffer, and the procedural data word storage cells. The selective transferring apparatus is preferably embodied as a source bus coupled to the processor unit and OR gate circuitry for transferring the non-procedural data words from the data word buffer and the data address buffer to the source bus and the procedural data words from the procedural data multiplexer to the source bus.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 2 is a detailed block diagram of the processor unit within which the interfacing device of the invention is included.

FIG. 6 is a table illustrating the signals used for addressing the control store of FIG. 5 and for responding to various branch conditions arising from the performance of the firmware stored in a control store of FIG. 5.

FIG. 10 is a detailed block diagram of the interfacing device of the instant invention.

FIG. 11A illustrates in truth table form the control of the prefetch buffer of the interfacing device.

FIG. 11B illustrates in truth table form the manner in which the procedure multiplexer of the interfacing device is loaded.

FIG. 14 illustrates hardware embodiments of a set of OR gates of the interfacing device shown in FIG. 10.

FIG. 21 illustrates a hardware embodiment of circuitry for generating control signals for controlling the transfer of status data through the interfacing device of FIG. 10.

DETAILED DESCRIPTION OF THE PREFERRED EMBODIMENTS

1. System Overview

Figure 1:
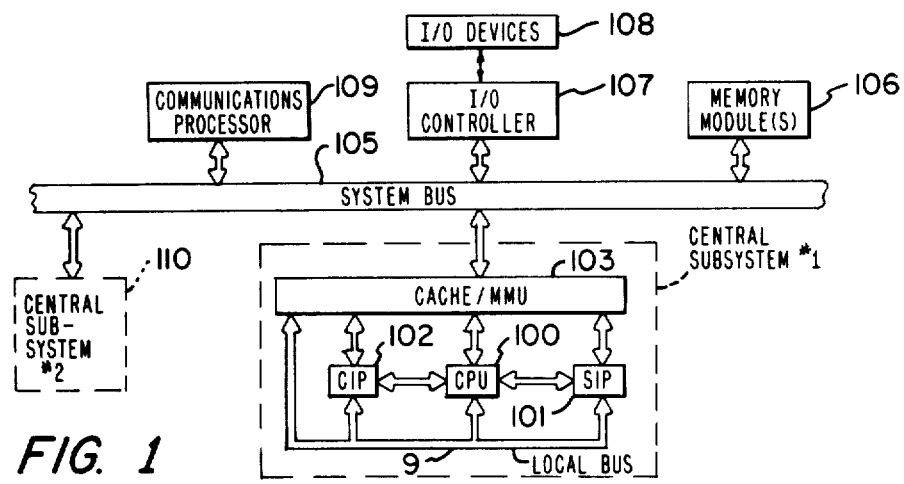
FIG. 1 is a functional block diagram of the system within which the interfacing device of the present invention may operate.

FIG. 1 is a general block diagram of the configuration of the system in which the CPU to be described may be included. Such system, includes a central processor unit (CPU) 100, and optional processors which may include a scientific instruction processor unit (SIP) 101 and a commercial instruction processor unit (CIP) 102. These optional processor units may be used to extend the range of the basic processor unit 100 for special applications. The system may also include a Cache/MMU (Cache memory/memory management unit) unit 103, an electrical system bus 105, memory modules (main or system memory) 106, input/output (I/O) controllers 107 coupled to I/O devices 108, and a multiline communications controller or processor (MLCP) 109. The system may also include a multiprocessor configuration in which there is a second central subsystem 110 which includes all or a portion of the above described system.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory address. The function of the local bus is to provide an interconnection among the three processors and the Cache/MMU unit. There is one physical local bus 9 which is organized into numerous interfaces. As shown in FIG. 1, there are private interfaces between the CPU 100 and the other two processors. There is also a private interface from each processor unit to the Cache/MMU. The local bus is a time-shared or public interface, that is, shared by all three processor units and by the Cache/MMU. In addition, the Cache/MMU 103 provides an interface via the system bus 105 to the rest of the system, primarily the memory 106 and the I/O devices 108 via controllers 107.

The CPU block diagram of FIG. 2 will now be discussed. More particularly, the various electrical buses and functional units and their interrelationships shall be discussed. The primary elements of the CPU are shown within the dotted lines. A first such element is the local bus interface 10 which includes a data buffer, a round robin procedure storage buffer 36, and various procedure/data word and address multiplexers (muxes) coupled with a source bus 33 as well as other devices to be discussed. The first element 10 is utilized for the purpose of receiving data from the system bus 105.

A second element 16 is the arithmetic element and includes several devices including two sets of register arrays (RAMS) called the DRAM 11 and the BRAM 12, and the RAM or R Bus 13, to which RAMS 11 and 12 connect. It also includes the Input or Inner Bus 14 to which the BRAM, as well as other devices, connects. The second element also includes the DALU 15, i.e., the arithmetic logic unit, which is coupled to drive the DRAM 11.

A third element 22 of the CPU includes the Outer Bus 17 and the Write Bus 84, the shifters 19-1 and 19-2 which connect them, and the selectors which drive them. These selectors include the DALU/R Bus selector 30 and the Y register/P register (YP) selector 21.

A fourth primary element 27 is the address section of the CPU and includes the procedure address register (P) 23 and the data address register (Y) 24. It also includes the address multiplexer 25 and the Prefetch address register 26. Also included in element 27 is the write data register (W) 28, and the write data selector (WS) 29. This portion of the CPU is utilized for the purpose of transferring data to the local bus 9.

Figure 5:
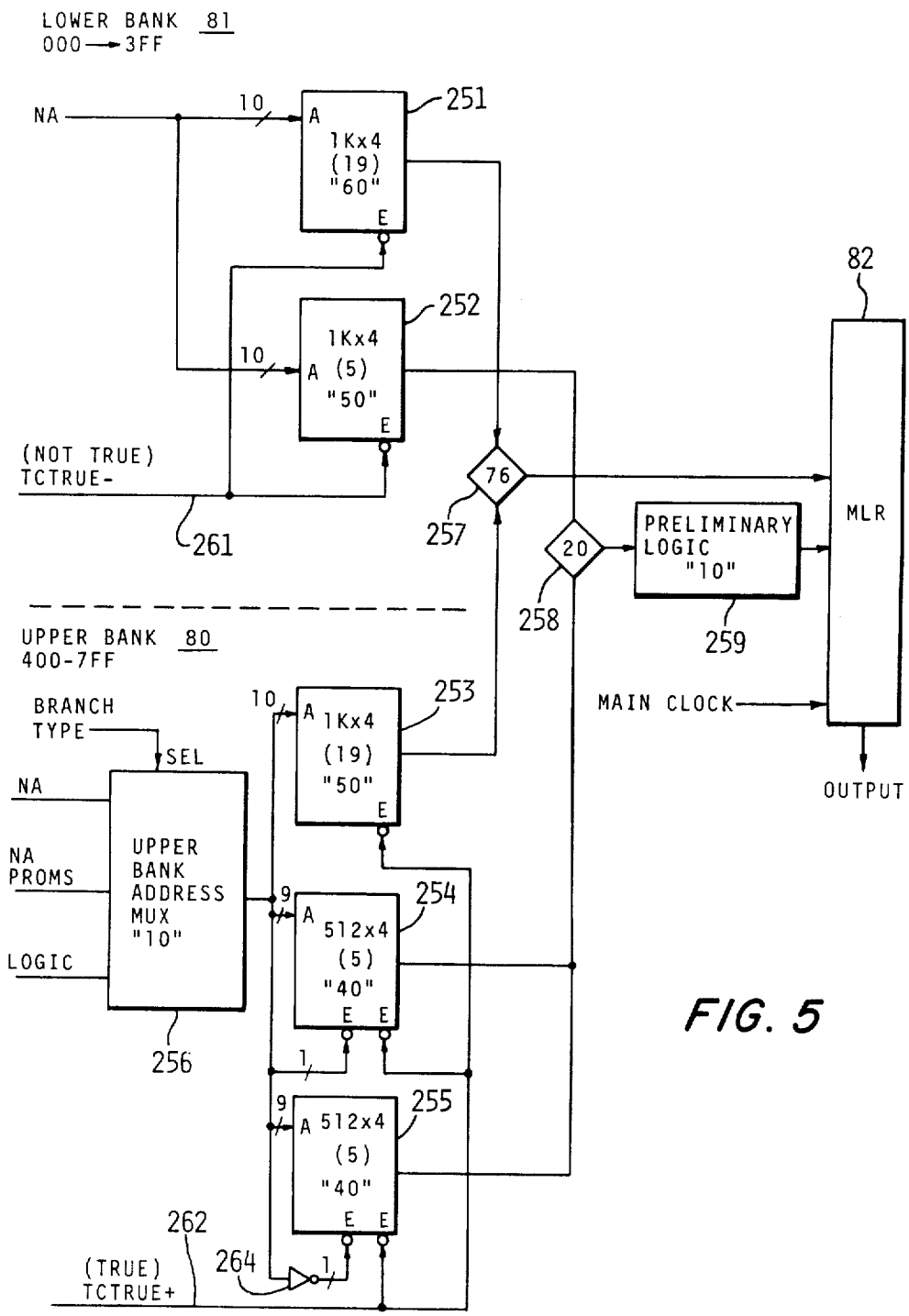
FIG. 5 is a detailed block diagram of the control store and associated logic included in the central processing unit of FIG. 2.
Figure 7:
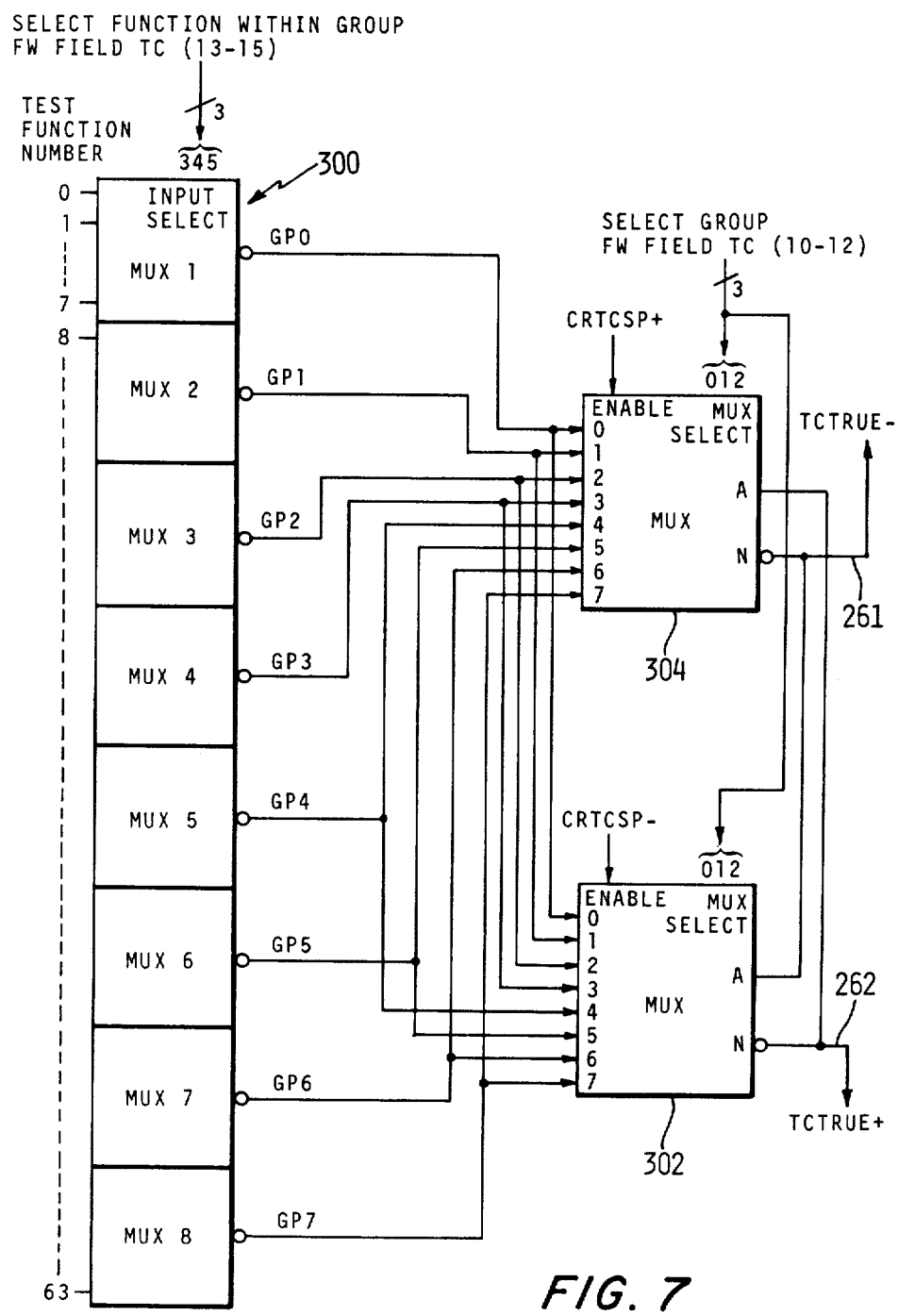
FIG. 7 is a detailed block diagram illustrating test logic used to enable the control store of the central processing unit of FIG. 2.

Device 30 is the test logic of the CPU, which is shown in FIG. 7, and includes a set of eight-to-one multiplexers which in turn drives a second set of at least two eight-to-one multiplexers which generate a single binary signal called "Test True" or "Test False", which is then used to control branching in the firmware. The Test True and False signals are coupled to the PROMS included in the control store banks 80 and 81 as shown in FIG. 5.

The next address generator 44 is coupled to the F register 38 and the F Bus 37. The next address generator is primarily concerned with generating addresses for use in the CPU.

The function of element 10, which is the local bus data input area, is to receive data which is returning from the Cache/MMU or from other devices on the local bus, to select data from the bootstrap PROMs if a bootstrap procedure execution is requested and to direct such data to the appropriate data buffer. If an instructional fetch is called for, the data is placed in the function register. More particularly, the primary data buffer 31 receives 16 or 32 bit data words from the local bus 9. Its output is connected to the L bus 32. The L bus is used both to drive the source bus 33 by use of a pair of selectors DA 34 and DW 35 and to drive the four word procedural data word buffer 36. Non-procedural data words enter the CPU via the source bus 33 which is driven from the data selectors on the L bus 32. Procedural data words enter the CPU via a different set of selectors, PA 39 and PW 40, coming from the procedure buffer 36. The procedure buffer has the responsibility of containing the next two or three procedural data words to be executed, so that when they are required, time will not have to be spent fetching them. It is automatically reloaded from the Cache/MMU via the local bus as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN location of the F register 38.

Also in the element 10, which is the data input area, there is a set of bootstrap PROMs 41 which can be used to provide instructions, in place of instructions from memory if operating in the bootstrap mode.

The storage device 36 having locations A, B, C, and D, is a round robin four-word procedural data word store. Whenever it has room for two procedural data words, i.e., it is at least half empty, then it automatically initiates a memory read of procedural data words via the local bus 9, from the Cache/MMU. The returning procedural data words are dropped into the next two locations which are available in this round robin store. As the CPU uses procedural data words by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a conductor included in device 36 which successively enables the four locations to the outputs of device 36. The left-hand cursor or pointer 36-2 indicates the next procedural data word to be fetched; the right-hand cursor 36-1 represents the procedural data word following that. Sometimes one word of procedure is used up in which case the procedural data word indicated by the left-hand cursor would be used to generate the information, passing through the PW multiplexer 40. Sometimes there is a requirement for two procedural data words (as when pulling a large address form (LAF) address). Then the procedural data words indicated by both the left-hand and the right-hand cursors are combined in the PA multiplexer 39 of the procedure selector. This will be described more fully when this logic is described.

Thus, element 10 is the area concerned with bringing data into the CPU through the source bus, via either data selectors 34 and 35, or the procedural data word selectors 39 and 40, or bringing data directly into the instruction (F) register 38 via the procedural data word buffer 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the five-bit F' register 76.

The second element 16 contains the arithmetic/logic unit (DALU) 15, the BRAM 12 and the DRAM 11, containing all of the programmer visible registers, plus a number of non-programmer visible work registers. These data storage elements are organized as follows: The DRAM 11, which is one of the two sources which can drive the RAM bus 13, contains 32 locations, each of which is 24 bits wide. These locations are used to hold so-called D registers, two halves (K & L) of the so-called K registers which are 32 bits long, a number of internal pointers, and seven so-called M registers. The BRAM 12, which contains 16 words, each 24 bits wide, contains the seven base registers plus a number of programmer visible and programmer invisible pointers of various types.

Figure 3:
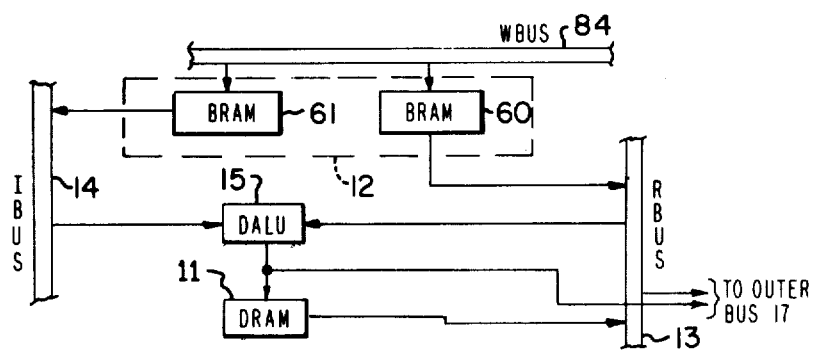
FIG. 3 illustrates details of the connections to the arithmetic logic unit of the central processing unit of FIG. 2.

FIG. 3 shows in more detail the relationship between the RAMs, the buses, and the DALU 15. The DRAM and BRAM can each be sources to the RAM bus 13. The BRAM 12 is actually a dual structure; that is, there are two parallel BRAMs 60 and 61 in the CPU. The two elements of the BRAM are loaded identically. One such element which drives (or transfers data to) the R bus is element 60, and the other which drives the I bus 14 is the BRAM element 61. The important aspect of the two identical BRAMs is that the system speed is increased.

The R bus can be driven either by the BRAM 60, or by the DRAM 11. Other sources, as will be seen, also drive the I bus 14. The DALU 15 uses the I bus and the R bus as its inputs and the output of the DALU is then recycled to the DRAM and/or used elsewhere in the CPO.

Element 16 includes two buses of major interest. The so-called input or Inner bus (I) 14 is the primary source of original input within the processor, that is, data from memory comes into this bus as does the output of the Q register 50 via driver 54, and also the output of the BRAM 12. The second bus, the so-called R or RAM bus is the point at which the outputs of the two different RAMs, the BRAM and the DRAM, are coupled. The outputs of these two buses are the inputs to the DALU 15, which generates data which can either be returned into the DRAM or sent to the outer bus 17 for further processing in the system.

Both the inner and the RAM buses employ a hardware element referred to as the so-called "batlatch" (BL) which is a gate whose input and output are tied together for coupling signals onto the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processing unit, and is connected to it via 16 bidirectional signal lines. Memory data couples to the Inner bus 14 via a set of drivers called the data latches (DL) 51. The data latches are paralleled by a second series of latches called SE or sign extension latches 52. These SE latches are used either to sign or zero extend the data latches when they are only providing a sixteen bit quantity to the 24 bit bus. Similarly, the SE logic 52 is used to take either 7 or 8 bits of the current instruction, and sign extend it to 24 bits for use by the branch and value instructions which get their displacement and their operand, respectively, from the right-hand portion of the instruction word.

There is also associated with the BRAM and DRAM logic called the select/modify logic 53, which allows the DRAM and the BRAM to be addressed in blocks of eight registers, using various fields in the instruction to control the individual register selection within that block.

Contants generator (KON) 70 is also included in element 16, the primary ALU area, and is another source to the Inner bus 14, that is, it is the source that can be used to generate 24 bit constants onto the inner bus for use by the arithmetic unit under control of the firmware.

Thus, element 16 is the primary arithmetic operation area in the CPU; that is, it is concerned with operand manipulation and with the generation of operands for insertion into the data RAM, or operands which are intended to be sent to the Outer bus, either to be returned to the BRAM, or to be sent to the various address and data registers for output to the local bus 9.

Element 22 is concerned primarily with the section of the CPU referred to as the Outer bus, and the write bus. The Outer bus is the bus upon which various data paths are collected, i.e., the Y register, the P register, the output of the DALU and the RAM bus. The Write bus is the bus which is used to transfer operands to the BRAM, to the write data registers, and to the BALU 55 which is the ALU primarily responsible for address manipulation.

Between the Outer bus 17 and the Write bus 84, is a set of twenty-four multiplexing shifters 19, which allow the shifts of 1, 2 or 4 bits in either direction on Outer bus 17 operands. In addition, there is also a set of sixteen multiplexing shifters 56 which are used to load operands into the Q register.

Two of the four different types of operands which are sourced to the Outer bus originate at the DALU and at the RAM bus and are selected through a two-to-one multiplexer 20 coupled to the Outer bus 17. Two other sources for the Outer bus are the Y register, which is the data address register, and the procedure address (P) register. The outputs of these two units are coupled via a two-to-one multiplexer (Y/P selector) 21 and sourced onto the Outer bus 17. Also coupled to the Outer bus 17 is the I register 57, the indicator register for the central processing subsystem. The contents of the Outer bus 17 can be transferred either directly or shifted to the Write bus 84 for further processing in the CPU. They can also be loaded into the Q register 50 directly so that the Q register can be used for double precision shift operations.

All shifting which takes place within the CPU takes place by manipulation of operands between the Outer bus and the Write bus. The twenty-four shifters 19 are used to shift 24 bit operands, the size of the operands on the O bus 17 and W bus 84, left or right under the control of the control store word. They can shift by either 1, 2, or 4 positions, transfer the operand straight through, or transfer the operand through with the two right-hand bytes of the operand interchanged. The operation of these shifters is controlled by a special field in the control store word. This section of the CPU is used for 24 bit operands shifts. When 32 bit (double register) operands, are shifted, the right-hand operand is loaded into the Q register via the Outer bus, and then a shift is performed in which not only the W bus shifter 19, but also the sixteen Q register shifters 56 are operated. The Q register contents are thereby treated as a 16 bit extension on the right-hand end of the 24 bit operand which is being shifted onto the W bus 84; the ends of these two shifters are coupled together, thus allowing a 40 bit shift to occur. In such double register shifts, the operands of interest are the 16 bits which are returned to the Q register and the 16 bits which are transferred to the right-hand two bytes of the Outer bus, while the left-hand eight bits of the W bus data are usually discarded.

Element 75 represents the collection of the status bits in the CPU for emission to the W bus via driver 93 under certain conditions. The W bus has two sources, the primary one being the shifter 19 from the Outer bus 17. This shifter 19 can be disabled as an input to bus 88 and instead the status bits (S/Z) 75 can be placed on the Write bus 84 for subsequent analysis by the firmware.

One unit of hardware which is associated with the Q register which has not been previously discussed is the XB register 58 and the decoder 59 coupled thereto. The XB register 58 is used during index shifting to capture those bits of the index which are shifted right for sub-word operands and which are lost because they move to the right of the single word bit in the address. They are captured in the XB register, one bit for half-word shifts, two bits for digit shifts, and four bits for bit-sized operand shifts. The XB register contents are subsequently used to directly control left versus right half selection when dealing with half-word operands, when generating a parameter to be sent to the commercial instruction processor unit for digit operands, and to generate a mask of 15 binary zeros and a single binary one, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items that can be loaded into the Q register is the decoder mask generated from the contents of the XB register 58.

The fourth major element in the CPU is area 27, the element which is concerned with the generation of addresses, commands and operands for transmittal to the local bus 9, and via the local bus to either the CIP unit, the SIP unit, or the Cache/MMU and hence, to memory or to Input/Output (I/O) devices. This major element can be broken down into approximately three areas, the first being the write data register (W) 28 and the write selector (WS) 29. Register 28, is a 32 bit register with a partitioned load capability, that is, either the right half or the left half, or both halves of this register can be loaded. The right half is always loaded from 16 bits of the Write bus 84 via drivers 74. The left half is written with data which comes from the write selector 29. This write selector has as its 16 inputs either the 16 bits of the right half of the Write bus or the eight left-hand bits of the Write bus plus either sign or zero extension. The Write bus is the primary path by which data can be sent to the W register 28 in order to subsequently write such data to any other device coupled on the local bus.

The next area in the local bus output interface 27 is the command driver 71. The command driver 71 drives a series of command lines which accompany all transfers by the CPU on the local bus and indicates to the Cache/MMU either a memory reference cycle, an I/O reference cycle, or a local bus reference cycle to the Cache/MMU or one of the local bus processing units. The information which is transferred onto the command lines is derived from the F and FK fields of the control store or firmware (FW) word shown in FIG. 4, which also at other times the functioning of the F register 38 of element 10.

The third portion of element 27 includes the two primary address registers, i.e., the Y register 24, for non-procedural data word memory addresses and for addresses to other devices on the local and system buses, and the P register 23 (the program counter), and the prefetch register 26.

The P counter 23 keeps track of the last word which the firmware has used, which word has been taken from the round robin buffer 36 and input to the CPU for operations thereon. The prefetch register 26 keeps track of which word is to be next fetched from memory; that is, the P and PF registers may differ by any number in memory address from one to four words, depending on how full the round robin buffer is and how recently the central processing system has taken procedural data words from the buffer. If the central processing system has taken all the procedural data words from the buffer, it takes a finite amount of time for the Cache/MMU to respond with new procedural data words in response to a request, and fill buffer 36 again. Under those circumstances, the prefetch register 26 and the address of the P counter or register 23 would be close together or the same in address content. When the buffer 36 is full, and the CPU has not taken any procedural data words recently, then the P register will be two to four words behind the prefetch register because it is indicating the last word taken from the prefetch register indicates the next word to be sent forth from memory as soon as there is room for it in the prefetch register.

The contents of the P register 23 are never admitted to the local bus as a memory address source. The two sources for data which can go to the local bus via the virtual address multiplexer 25 are the Y register 24, which is used for all non-procedural data word fetches, and the prefetch register 26, which is used automatically by the prefetch logic to go to memory and request procedural data words for use in subsequent firmware steps.

The arrows on devices 23, 24 and 26 are indicative of the incrementing capability of those particular registers. That is, the P register can increment by either one or two words depending on the number of procedural data words which are taken out of the prefetch buffer at a time. That is, pulling one procedural data word from the prefetch 36 buffer automatically increments the P register by one; pulling two procedural data words from the prefetch buffer 36 automatically increments the P register by two. The prefetch register always increments by two, because prefetches are always performed on a pair of procedural data words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right-hand 16 bits of the Write bus to be transferred to the right-hand 16 bits of the W register. The multiplexer 29 is conditioned such that the left-hand eight bits of the Write bus and the eight binary zeros are emitted to the left-hand half of the W register 28. This loads a two-word, 24-bit, address into the W register for subsequently writing into memory. If it is desired to write a single word into memory, then the right half of the W register is not clocked (i.e., enabled), and does not change; and the multiplexer 29 is conditioned to enable the 16 right-hand bits of the Write bus to the 16 left-hand bits of the W register where they are clocked in. For single word writes, the left half of the W register is the data that is written into memory.

The logic heretofore described is used to request and accept data from other entities on the local bus, such as the Cache/MMU or the CIP unit or the SIP unit, to operate on it and store it internally in various registers via the two ALUs which are contained in the system, to create now operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store 80 and 81 which is included in the CPU.

Figure 4:
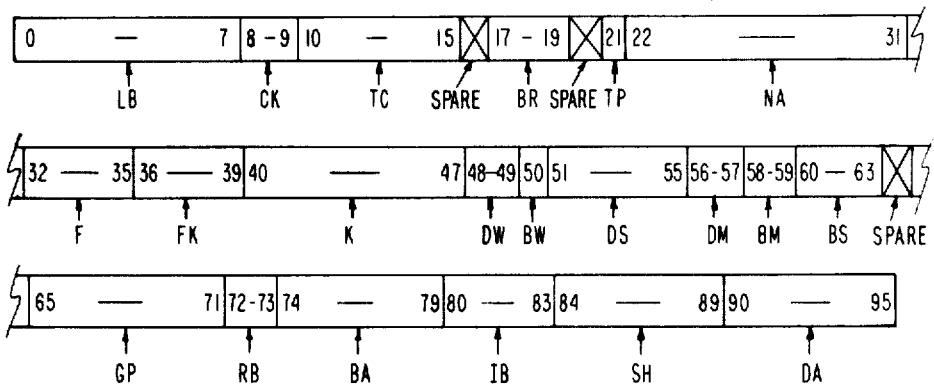
FIG. 4 illustrates details of the composition of locations of the control store included in the central processing unit of FIG. 2.

The control store is partitioned into a number of individual fields, each of which controls some aspect of the internal performance of the CPU. FIG. 4 illustrates the firmware word and the various fields of interest therein. The first of these fields is the local bus (LB) field, bits 0 through 7 of the control store. The LB field is concerned with the requesting of various cycles from the local bus and the responses thereto. It is also responsible for the emission of virtual addresses via the prefetch register or the Y register, and it controls the various incrementing of the Y and P registers. The local bus field also controls the successive reading of procedural data words from the round robin procedural data buffer 36, and the enabling of the non-procedural data word and procedural data word multiplexers 34, 35, 39 and 40 respectively, onto the source bus 33 for subsequent use by the Inner bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses: 96 nanoseconds, 105 nanoseconds, 130 nanoseconds, or 170 nanoseconds. Which of these is used for a firmware step is controlled by the CK field for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition, that is, what type of branch occurred, whether the branch simply selects between two firmware steps, or whether it selects between a firmware step and a so-called control store splatter (the generation of one of a multiplicity of control store next addresses based on the state of one or more logic elements in the CPU in which the next address is controlled by some function of the F register 38 contents).

The next field of interest, the TP field, bit 21 is the Test Polarity field. It controls whether the test condition is tested to determine whether it is true or false.

The NA field, bits 22 through 31 is a ten-bit field which is used to generate at least one of the two addresses which are selected by all branches. The other address is either also derived from the same NA field or from the control store splatters previously mentioned.

The next field, bits 32 through 39, is the F register control field, partitioned into a four-bit part called F and a second four-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices are loaded and what sources they have for their loading are all controlled by the F and FK fields.

The next field, bits 40-47, is the K (i.e., constant) field, and is used to drive the I bus 14. It is an 8-bit field which provides the right-hand eight bits for all constants which are admitted to the I bus. The left-hand 16 bits of the constant are controlled by the I bus field which will be discussed hereinafter. The K field is directly related to the KON device 70.

The next field in the control store, bits 48-63, is concerned primarily with the addressing and control of the DRAM 11 and the BRAM 12. The two-bit field, DW, is used to control writing into the DRAM with one bit controlling write operations into the left most (the most significant) 8 bits of the DRAM, and the other bit controlling write operations into the second right most (the least significant) 16 bits. The next bit, bit 50, (field BW), is used to control write operations into both parts of the BRAM, which are always written into together. The next field DS is five bits in length and provides the selection of one of 32 registers in the DRAM 11. The DM field, bits 56 and 57, is the select-modify field associated with the DRAM and allows the selection of either the DRAM directly or any of three different functions of the F register 38 for qualifying the addressing of the DRAM.

The next field of interest is the B select field (BS), bits 60 through 63, which is used for the selection of one of the 16 registers in the BRAM. The two-bit field comprising bits 58 and 59, is the select-modify field (BM) for BRAM addressing. It performs similarly to that for the BRAM addressing except that it is separate so that independent select and modify functions can be specified for both the BRAM and DRAM.

The next field of interest is the GP field, which is seven bits in length (bits 65-71), and is used to control a large number of general purpose micro operations within the processor, such as the clocking of various bistable flip-flops and the enabling of various control functions. It is also used to control access to the control panel from the CPU, to input and output data to the control panel, and to control various flip-flops therein.

The next field, the RB field, bits 72 and 73, is used to control the sourcing of data onto the R bus 13 with one bit controlling the BRAM and the other bit controlling the DRAM.

The BA field, bits 74 through 79, is used to control the functions of the BALU 55, the arithmetic/logic unit which has as its inputs the I bus and the W bus and which can be used to drive the Y register 24. These six bits are used as follows: one as a carry inject to the BALU, one for logic/arithmetic control, and the other four to select particular functions.

The next field of interest is the IB field, bits 80 through 83, and is used to control which data source is enabled to the Inner bus 14. This field can enable the data latches, sign extend the F register or select a constant, or the BRAM in various combinations to the I bus. The next field, the SH field, bits 84 through 89, is used to control both the shifters and the W bus sourcing which was discussed earlier. These six bits enable the system to have a large amount of autonomous control over what registers are enabled to the W bus and whether or not the Q register loads and in what direction the shifters shift the operand as it passes through.

The final field, the DA field, bits 90 through 95, is the function control for the DALU 15 with six bits having analogous functions to those in the BA field, i.e., one bit is a carry inject, one bit selects logic versus arithmetic and the other four bits are to select particular functions.

The control store for the CPU is actually two control stores: an upper bank 80 and a lower bank 81. The upper bank is addressed by the next address generator 44 and the lower bank is addressed directly by a portion of the contents of the then current control store word. In the case of the more common types of branches, both use the NA field of the control store word as the basic source of the next address, and modify it in some way so that the two addresses which go to the upper and lower bank are essentially identical. In the case of the other branches, those which select between a next address and a PROM generator splatter, the lower bank receives the next address field unchanged from the current control store word, while the upper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data in the control register 82. The details of the control store shall be discussed hereinafter.

The manner in which the CPU and firmware interact to perform certain typical central processor unit operations, such as (a) reading a word from memory; (b) computing a next address for reading another word from memory; (c) writing a word into memory and (d) performing some type of iterative algorithm in which the operations are entirely internal to the CPU, will now be discussed. The situations given will be typical and representative operations will be described.

In the case of reading a word from memory, during a control store step, the control store word will enable the virtual memory address of the word from the BRAM 12 onto the RAM bus 13 via the RB, BS, and BM fields. Then the SH field will condition the Outer bus and the W bus sourcing such that the RAM bus is enabled through the selector 20 to the Outer bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating that a memory request is required and that the address provided to the local bus should be used to make such request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory, which monitors and controls all activity on the local bus, acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return cycle is detected, then the stall ends, and the CPU will then enter the fourth step of this read cycle.

The fourth step will be one in which the firmware will specify an LB field which uses the data that is in the data buffer, and sources it onto the Inner bus for use by the CPU. The LB field will thus enable either the DA driver 34, or the DW driver 35, depending on whether a word, 16 bits in length, or an address, 24 bits in length, is required onto the source bus. In turn, the I bus field will specify that the source bus, either all 24 bits of it, or 16 bits sign extended to 24, will be enabled onto the Inner bus. In the Inner bus, assuming that there is a 16-bit word that is being received back from the data buffer, the DA field would be used to enable the DALU to read the Inner bus, and then the DW, D select and DM fields would be controlled to address and write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequence of operations which may be performed by the system is the manipulation of operands in an arithmetic operation, such as adding an operand which has been fetched from memory to one of the data registers and then, after the addition, returning to the data register and also placing it into the write data buffer so that it can be subsequently written back into memory. This sequence of operations would begin following the stall referred to in the previous operation. This step would be one which enabled the data, which in the case of a word operand would be a word, from the data buffer 31, via the L bus and the data multiplexers 35, onto the source bus. Then, the I bus field would specify that the source bus, sign extended via the sign extension device 52 and the data latches 51 be enabled onto the inner bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the Outer bus and would be conditioned to select the DALU output instead of the R bus output for that purpose. Also at the same time, the shifter 1 would be conditioned to pass the Outer bus contents through without change to the Write bus 84. The same LB field which specified DW 35, to the source bus 33, would also have specified that the Write bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the Inner bus to its output. The LB field would be one which specified load the Y register. Since input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAMS would be enabled. The RB field would enable the DRAM onto the R bus. The SH field would select the RAM bus to the Outer bus 17 via selector 20, and the Outer bus to the Write bus 84 via shifter 19 with no shifting taking place. The LB field would specify load the W register, left half. This would be performed by conditioning the W selector 29 to enable the right two-thirds of the Write bus to the left half of the W register, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle, and would take the address, map it, send it to memory accompanied by the data, and indicate on the system bus to the memory that this is a memory write operation.

The fourth sequence of a typical operation which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the Outer bus via the selector 20, by enabling it to the Outer bus and selecting its input from the R bus, and would also specify that the Q register and the W bus both receive the contents of the Outer bus and would clock the Q register to load it. This would cause the operand addressed in the BRAM to be transferred to the Q register. The next step, or steps, would be those in which the shifts are actually performed. In this step, the other of the two registers containing the second operand in the BRAM is addressed by the B select field and the BRAM is enabled onto the RAM bus 13, via the RB field. Then the RAM bus would be enabled to the Outer bus via the selector 20. The SH field would take any of a number of values depending on which direction and for how many bits the shift is to be performed. The SH field is capable of selecting a left or right shift of either one, two or four bits. In any of these cases, the Q register is considered to be connected as an extension of the Outer bus, creating a 32-bit operand. Actually, it is a 40-bit operand, but the left-hand eight bits of the Outer bus are ignored. This 32-bit operand is shifted either left or right as indicated by the particular SH field. The 16 right-hand bits are returned to the Q register and the 16 left-hand bits together with the eight bits which were ignored are transferred onto the W bus. This is controlled by the SH field which has exclusive control over the shift distance.

The operand having been shifted from the Outer bus to the W bus and from the Q register back to the Q register, the SH field causes the Q register to reload the shited operand while at the same time the BW field causes the W bus to be written into the addressed BRAM location. Thus, the contents of the B and Q registers have been shifted and returned back to the B and Q registers. The particular end effects associated with this shift, whether this is an open, circular, or arithmetic shift, are a function of the control flip-flops in the CPU. This type of step, in which the actual shifting is performed, is performed some number of times in various combinations, that is, if it were desired to shift left by five bits, then a step which resulted in a shift left by one bit would be succeeded by a step which shifted left by four bits. To shift right by three would require a shift right by two and then by one, for example.

Then, after the final shift has been performed, i.e., after the operands are now correctly aligned in the addressed BRAM location and the Q register, the final step does not cause a shift, but instead returns the Q register contents back to the BRAM location from which it was originally loaded. This would be performed as follows. The I bus field would specify that the I bus is driven by the Q register (16 bits of Q extended by eight bits of binary zeros). The DALU 15 would be controlled by the DA field so that it passed through the I bus unchanged. The SH field would be selected so that it enabled the DALU, unchanged via the selector 20, to the Outer bus 17, and again unchanged, via the shifter 19 to the W bus 84. The BW bit 50 in the firmware word would then be set to condition the loading of the BRAM from the W bus, and the BS (B select) bits would be conditioned to specify which of the 16 locations in the BRAM were to receive the shifted operand. This would all take place in some number of firmware steps, for example, three or more. One step would be used to load the Q register creating a 40 bit operand, one or more to perform the shifting of that operand as required, and then one to return the Q register contents (the right-hand 16 bits) to the BRAM to complete the operation.

FIG. 5 illustrates the organization of the upper and lower bank control store PROMs 80 and 81 respectively, and more particularly the manner in which they are coupled or paired for maximum speed. Each of the banks of the control store includes one or more PROMs, each of which PROMs include a plurality of electronic chips. By way of example, the storage capacity of each bank may be 1024 (1 K) addressable locations, each containing 96 bits, i.e., twenty-four chips of 1 K each, each location having four bits of storage. To increase the speed of operation, each bank has at least two PROMs, with one PROM faster (lower address propagation time) than the other in each bank in order to compensate for propagation time in other elements included in the control store. Two banks are utilized primarily for efficiently accommodating branch decisions derived from the current firmware word and the next address generator 44. One bank is organized to be addressed directly by the firmware word whereas the other bank (for example, the upper bank) is organized to be addressed by the firmware word and/or a derivative function of the firmware word and various logic elements included in the CPU 100. Accordingly, the upper bank requires a multiplexed input and as shall be discussed, one of the two PROMs in the upper bank is provided with a faster address propagation time than any of the other PROMs in either bank. This is done as a practical matter by utilizing two PROMs, each with an increased speed of operation, i.e., lower address propagation time.

The purpose for pairing of the control store PROMs is to reduce the amount of time necessary in order to generate the next control store address, to select data appropriate to that address, and to enable it to the input of the main control store data register, the so-called MLR 82, which is the output register of the control store. This has been done in the past by using a single set of control store PROMs and selecting the address supplied to them. In such cases, the time required to propagate data through the control store logic is the address select time, i.e., the time from the change of the address input to the PROM to the time at which the output is stable. For typical control store PROMs, this is much longer than the so-called "enable time". Control store PROMs which have an enable input, can typically be turned on and off much faster (the "enable time") than addressed outputs can be provided. Therefore, the basic approach here is to separate the control store PROMs into two groups or banks so that the respective addresses for each group, for example, one of two branch addresses, can be propagating through the control store chips simultaneously, and so that the decision as to which address to utilize can be postponed until the very last moment when the decision is implemented by enabling the output of one or the other of the two groups or banks.

In the described CPU, as with some other computers, all so-called branch operations have a selection of one of a pair of addresses, one of which addresses is explicitly provided by the control store word in the current step, and the other of which is more or less indirectly generated from data available in the current step. In the instant CPU, this pair of addresses is constrained in such a way that all branches consist of selecting between two addresses, one of which is for the lower bank and the other of which is for the upper bank. The lower bank may utilize addresses in the range from 000 through 3FF (hexadecimal), and the upper bank control store addresses from 400 to 7FF (hexadecimal).

The structure used to implement this method of control store partitioning is shown in the block diagram of FIG. 5. As can be seen, the control store is partitioned into five sets of control store elements or PROMs 251 through 255. Elements 251 and 252, which, as indicated in the drawing in parentheses, include a total of 24 control store chips (19 in element 251 and 5 in element 252) are those that contain the data for the lower bank of the control store. Elements 253, 254 and 255 (which include a total of 29 chips) are those that contain the data for the upper bank. Three types of integrated circuits are used to implement these elements. Element 251 is made up of 19 1 K (1024)×4 bit control store chips with a typical address propagation time of 60 nanoseconds. Elements 252 and 253 are made up of specifically selected 1 K×4 bit control store chips with a typical address propagation time of 50 nanoseconds. Elements 254 and 255 are made up of selected 512×4 bit control store chips with a typical address propagation time of 40 nanoseconds.

There are two reasons why chips or circuits with different propagation times are used in this logic. The selected parts in elements 253, 254 and 255 are selected to be faster than their counterparts in elements 251 and 252 in order to compensate for the propagation time through the upper bank address multiplexer 256. In addition, elements 252, 254 and 255 are selected to be faster than elements 251 and 253, respectively, because of the propagation delay required in the preliminary logic 259 that is in series with their output to the MLR 82.

The upper bank address multiplexer 256, which is included in next address generator 44, is used to provide one of the two addresses that are being selected among any firmware branch. The lower bank address (the address used by the lower bank control store PROMs) is more or less directly related to the next address which is in the control store word (the NA field) and is the address which is explicitly selected in that control store word. The other address which is used for a branch, that which is used in the upper bank, is some logical derivative of the NA field or is a logically generated address from PROMs or other logic in the CPU as shown by the three inputs to MUX 256, which are selected in accordance with the branch type. This other logic, i.e., the PROMs, and the other logic, and the upper bank address multiplexer which selects it, takes additional propagation time which is not present in the address path in the lower bank. The difference between these two address paths is compensated for by the difference in the speeds of the control store chips in series with it. By utilizing one bank (i.e., the lower bank) which has a direct address path, only some of the PROMs need to have increased speed whereas if a MUX, such as MUX 256, was used for both banks, all PROMs would have to have increased speed in order to provide the same propagation time.

As has been noted the propagation delay up to and through the upper bank address MUX 256, which is generating address bits which are received by the faster PROMs of the upper bank, are uniformly faster than their lower bank counterparts. Thus, the data at the output of each PROM is stable at approximately the same time.

The preliminary logic 259 which is connected to the output of the fastest PROMs in each bank, that is elements 252, 254 and 255, is used to perform some preliminary logic decode of the next control store word prior to latching it in MLR 82. That is, this may include the select modify logic 53 which is used to generate the address inputs for the DRAM 11 and the BRAM 12, and which address inputs have to be available early in the control store cycle. More particularly, the address inputs cannot wait to be generated after the main clock has enabled the data into the MLR, but must be generated at the input to the MLR so as to be available as soon as the clock transition has taken place.

The source for the two addresses which are used for selecting a control store word in the lower bank and the upper bank are as follows. The lower bank address, NA, comes directly from the control store word for the current firmware step. Thus, it is available as soon as that control store word has been clocked into the MLR 82. The address NA is an input to both elements 251 and 252. The upper bank address, at the output of multiplexer 256, i.e., the address inputs to elements 253, 254 and 255, is a logical derivative of a number of logic functions included in the CPU. The address multiplexer may be the present embodiment generate eight different functional addresses which can be used by the upper bank. These are the result of the eight possible branch types which can be specified in the control store word.

These branch types are known as X0 and X1, XA, XB, XR, XE, XW and XL as shown in the table of FIG. 6. Branch types X0 and X1, which are the most common types of branches, are basically a direct logical function of the NA field. Such branch types use the NA field, with the low order bit NA10 or NA(A) unchanged NA(A) or complemented NA($\bar{A}$). The other six branches are used for specific purposes. The XA branch is used for selecting the appropriate starting address to initiate the decode of a new instruction's opcode. The XB branch is used to perform the initial decoding of some of the address syllables which are possible in the CPU. The XR branch is used to select the starting address for the execution of the routine to read the operand in most cases, or for the execution of certain instructions which are capable of execution immediately. The XE branch is used to select among the starting addresses of the firmware routines which are used to execute the individual instruction algorithms. The XW branch is used to select one of a number of routines which are used to store the operand. The XL branch is used to allow a simplified firmware splatter under the control of the firmware. This branch uses the contents of the link register, which can be loaded under firmware control to control four bits of the upper bank address.

All of the major branches, XA, XB, XR, XE, XW and XL use the two high order bits (NAS 1, 2) of the NA field as their high order bits, but generate the remaining eight bits for their particular address in a different manner.

The XA splatter uses the output of five (5) XA PROMs to generate bits 3 through 10 of the XA next address.

The XB splatter uses three constant signals, two binary ones (11) and a binary zero (0), then one bit which is the output of one of the bit locations of the F register 38, and four outputs from a PROM which is driven by the F register to generate bits 7 through 10 of its NA field.

The XR splatter jams three bits with three binary zeros (000), generates the next bit with the contents of a control flop (KOP) whose state relates to instruction types, and generates the last four bits, bits 7 through 10, from an XR PROM.

The third bit of the XE splatter is the aforesaid instruction type signal. The next bit indicates whether or not bit 0 of the F register is zero, the next whether bits 1 through 3 of the F register 38 are all zeros or not, and bits 4 through 8 of the F register are utilized as bits 6–10 of the NA field.

The XW splatter gives a combination of signals: a constant zero and three outputs of a PROM which decodes and classifies operand size type for bits 4 through 6. Bit 7 is a logic one, bit 8 is an output of the PROM which classifies operands as either address or non-addresses, and, finally two bits which are the output of an XW PROM, for bits 9 and 10 of the NA which identifies whether the result is to go to memory, to a base or data register or to a so-called K register (not shown).

The address lines for the XL branch use bits 1 through 6 of the NA field for the first six bits, and then use four bits of link register to generate the four last bits (bits 7 through 10).

These various inputs are selected by the set of eight-to-one multiplexers which are the upper bank address MUX 256. The particular address which is selected through this MUX is selected by use of the current control store word. In the current control store word, branching is performed by selecting one test condition and testing it for either being satisfied or not being satisfied. The output of this logic is two signals, one TCTRUE— or NOT TRUE, the other TCTRUE+ or TRUE. TCTRUE— is the signal on line 261 in the block diagram of FIG. 5 and TCTRUE+ is the signal on line 262. These signals are connected to the enable inputs of the respective control store PROMs.

At the beginning of a given firmware step, the NA field becomes stable and that address immediately begins propagating through the control store elements 251 and 252. As fast as the logic operates thereafter, the output of the upper bank address MUX 256 becomes stable, and that address begins propagating through control store elements 253, 254 and 255. Note that one of the address bits at the output of the MUX 256 selects between element 254 and element 255. This is because these elements are implemented with higher speed PROMs having a smaller word storage capacity. Accordingly, what is an address line for a 1K word (4 bits/word) PROM, becomes a selective enable line for two 512 word PROMs, with one enable input of PROM 255 coupled via inverter 264. More particularly, in elements 254 and 255, which are the selected 512×4 bit control store PROMs, the address bits are partitioned slightly differently. The reason for this is that a 512 word PROM only requires nine bits of address. The tenth address bit, which is an address bit to all the other control store PROMs, is instead used as a second enable on the 512×4 control store PROMs. That is, element 254 would be enabled for addresses 400 through 5FF, and since the inverse of that same address line is coupled to element 255, it would be enabled for addresses 600 through 7FF.

Thus, as fast as the address are available, they are propagated through the control store PROMs. Meanwhile, in parallel, the TC (test condition) logic 30, as shown in detail in FIG. 7, is deciding whether the test condition is satisfied or not satisfied, with the outputs TCTRUE— and TCTRUE+ becoming stable thereafter. If the test condition in the polarity indicated was satisfied, then the low state TCTRUE+ will enable PROMS 253, 254 and 255, while TCTRUE—, being in a high state, will disable PROMs 251 and 252. Thus, the outputs of the wired OR connections as shown by symbols 257 and 258 (76 and 20 lines coupled respectively) will be the contents of the addressed upper bank control store location. However, if the condition was not satisfied, then TCTRUE— (not TRUE) will have the other polarity or state and will enable control store elements 251 and 252, while TCTRUE+ will disable elements 253, 254 and 255. In such case, the outputs of the wired OR connections 257 and 258 will be the contents of the addressed lower bank location.

The enable time for the control store PROMs is typically 15 to 20 nanoseconds. This is significantly faster than the address propagation time for a PROM which, as noted on FIG. 5, may be, for example, 60 nanoseconds for PROM 251. Thus, the "delay" from the time when the test condition results are known has been enhanced so that the enable propagation time of the PROMs is controlling rather than the address propagation time through the PROMs. The reason that these particular concerns have been taken with the timing through this chain of logic, i.e., the propagation time through the upper bank address generation and selection, the timing through the control store PROMs, and the timing through the preliminary logic, is that the worst case time at which the data at the input to the MLR 82 must be stable, is the time at which the main clock is triggered. It is one of the major functions controlling the cycle time, and thus the speed of the CPU.

If each of the control store PROMs had a 60 nanosecond propagation time, then in the worst case, if one were selecting an upper bank address, it would take 80 nanoseconds altogether from some preliminary starting point before the input to the MLR 82 became stable. Thus, to increase the speed, the use of PROMs having three different propagation times is desirable. PROM 252 compensates for the reduced speed or slow down caused by the preliminary or select/modify logic 259. PROM 253 compensates for the increased delay in addressing due to the upper bank address MUX 256. PROM 254 and 255 compensate for both the MUX 256 and the logic 259. Thus, the worst case time through this network is almost the same no matter which bank, upper or lower, is being used, and no matter which output is generated, one that goes directly to the MLR 82 or one that goes to the logic 259, before going to the MLR. If elements 253, 254 and 255 were not faster than elements 251 and 252, the clock period would have to be longer for any firmware step in which the upper bank was the one selected. Thus, the cycle time for that control store step would be longer because there would have to be allowance for the extra time for the next address PROMs and the upper bank address MUX to generate a stable address for the control store PROMs.

The basic principle involved in the logic shown in FIG. 5 is summarized as follows. Since the address path through the control store PROMs is so much slower than the enable path, the address path is always left open, that is, the next address is trickling through the lower bank control store and the output of the address MUX 256 is trickling through the upper bank of the control store, while the decision is being made as to which bank is finally going to be used. The timing of that decision becomes critical only when it becomes time to enable the outputs of these control store PROMs, in which case the test condition generated, true or false, will enable either the lower bank or the upper bank PROMs, depending upon which way the branch is going. The enable path is a much shorter time, 60 nanoseconds for the address propagation as compared to 15 nanoseconds for the enable propagation, thus allowing the decision for bank selection to be postponed for as much as 45 nanoseconds in a typical control store step, and thereby allowing each control store step to be significantly faster.

Now referring to FIG. 7, details of the test logic 30 for generating the TCTRUE+ and TCTRUE− signals is shown. The TCTRUE+ signal is generated at the negation output of multiplexer (MUX) 302 on line 262, and the TCTRUE− signal is generated at the negation output of MUX 304 on line 261. The lines 261 and 262 are coupled to the PROMs as shown in FIG. 5. The multiplexers 302 and 304 each have eight inputs (0–7), with each like numbered input coupled to receive the same input. Such inputs are received from the eight outputs of multiplexer 300 which actually includes eight multiplexers MUX 1–MUX 8, each having eight inputs and one output. The sixty-four inputs to multiplexer 300 are each coupled to receive a test condition from various functions included in the central processing unit 100 as indicated by test logic 30. Depending upon the condition of the function tested, either the upper bank or the lower bank of the control store will be enabled and accordingly addressed. The inputs to the multiplexers which are selected and/or enabled are determined by control bits received from the current control word, i.e., firmware word from the control store.

Thus, it is desirable to branch on a variety of different signals, which may, by way of example, be sixty-four in number, such that only one signal represents the selected one of the sixty-four inputs. The logic of FIG. 7 provides this capability with minimal propagation time by use of two levels of multiplexers, one level comprising multiplexer 300 and the other level comprising multiplexers 302 and 304. The logic of FIG. 7 also enables such branching based on either of two polarities of the same signal.

The operation of the logic of FIG. 7 is as follows. One input to each of the eight multiplexers included in multiplexer 300 is selected for propagation to the negation outputs, GP0 through GP7 respectively by the three bits received at select inputs 3, 4 and 5 of each of such eight multiplexers. These three bits are received from the TC field (bits 13–15) of the firmware word. The outputs GP0–GP7 are respectively coupled to the 0–7 numbered inputs of each of the multiplexers 302 and 304. The multiplexers 302 and 304 are also coupled to receive at their enable inputs the signals CRTCSP− and CRTCSP+, respectively. The CRTCSP signals (assertion and negation) are also received from the current firmware word, and more particularly, the TP field in the firmware word, transferred via the register 82. For bit 21 (the TP field), the element at the bit 21 location in the register 82 is actually a bistable element (flip-flop) having both a negation and an assertion output. Depending on the logic level required for other bits of the firmware word, either or both the assertion and negation outputs are used.

The multiplexers 302 and 304, which may be purchased from a semiconductor vendor such as Texas Instruments Inc. under part number SN74S251, will allow switching of the assertion and negation outputs of the multiplexer if the signal on the enable input is low or a binary zero. If such signal on the enable input is high, the outputs are floating and accordingly, as configured, such multiplexer having a high enable input will be effectively removed from the logic of FIG. 7. Thus, as can be seen, only one of the multiplexers 302 and 304 will be enabled at any given time. The outputs of the multiplexers 302 and 304 are coupled so that the assertion output of each multiplexer is coupled to the negation output of the other multiplexer to produce a so-called wired-OR circuit connection. Thus, with either of the multiplexers 302 and 304 enabled, the TCTRUE signals are obtained with the proper polarity. The TCTRUE signal which is low or a binary zero, will enable the bank to which it is coupled. That is, if TCTRUE− is low, the lower bank will be enabled.

Thus, as can be seen from the operation of the logic of FIG. 7, if the CRTCCSP− signal is high and accordingly the CRTCSP+ signal is low, then MUX 304 is active or enabled and the signal TCTRUE− reflects the level (high or low) of the one of sixty-four conditions being tested and TCTRUE+ reflects the inverse of such level. If the CRTCSP− signal is low and accordingly the CRTCSP+ signal is high, then MUX 302 is active or enabled and the signal TCTRUE+ reflects the level of the condition being tested and TCTRUE− reflects the inverse of such level. Whether the upper or lower bank of the control store is enabled depends upon which of the signals TCTRUE− or TCTRUE+ is low.

It can be seen that the opcode of an instruction read from memory 106 may be utilized to select one of several test conditions, which test conditions may be different from those received by MUX 300. In such case, the opcode bits could be utilized to select the test condition inputs to a first MUX similar to MUX 300 or a subportion thereof, and two multiplexers similar to multiplexers 302 and 304 could also be used in an arrangement similar to that shown in FIG. 7. It can also be seen that the use of the opcode to so select a test condition could be used independently of or in parallel with the logic of FIG. 7. If used in parallel, then the multiplexers 302 and 304 controlled by the firmware bits would have to be disabled when the multiplexers controlled by the opcode are enabled and vice versa.

Figure 8:
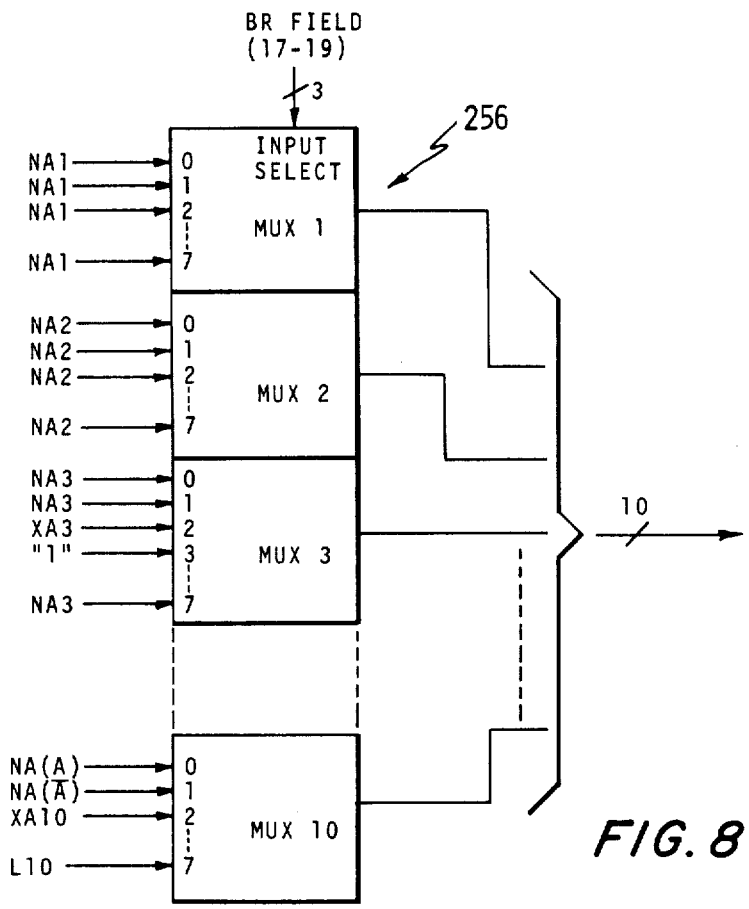
FIG. 8 illustrates the details of a multiplexer used in addressing the control store included in the central processing unit of FIG. 2.

Details of the MUX 256 and the connections thereto are shown in FIG. 8. More particularly, the MUX 256 is shown to include ten multiplexers each with eight inputs. The inputs to these ten multiplexers correspond to the signals identified in the table of FIG. 6. These signals are coupled for the eight branch types depicted in FIG. 6, such that the first signal for each of the branch types is received at the corresponding eight inputs of MUX 1 included in multiplexer 256. Thus, MUX 1 has coupled to each of its eight inputs the signal NA1. MUX 2 also has the same signal (NA2) coupled to each of its inputs. For each of the other multiplexers of MUX 256, except for the first two inputs, the signals coupled to the input are, for the most part, different. For example, MUX 3 has coupled to its number three input, the signal XA3 which, as shown in FIG. 6, is the third bit of the upper bank address for the XA branch, such third bit being a bit from position 3 of a so-called XA PROM which is not shown, but which may simply be a decoder coupled to receive its primary inputs from the F register 38 and whose output is coupled for receipt by MUX 3 of multiplexer 256.

The other inputs of the remaining multiplexers of MUX 256 also receive the inputs as depicted in FIG. 6. The first two inputs of MuX 10, (NA)(A) and NA(Ā) are of further interest. More particularly, the use of these two bits, one the complement of the other, allows more flexible and efficient pairing of control store (PROM) locations for branch operations. In the prior art, it has been known to branch on a branch hit condition to an odd PROM location and to branch on a branch no-hit condition to an even location, or vice versa. However, such prior art technique has limitations. For example, assuming four consecutive locations whose addresses are XXX000, XXX01, XXX10 and XXX11 (where X is either a binary 1 or a binary 0), a sequence which is branching can go to address XXX00 and XXX01 depending on a no-hit or hit condition, or another sequence can go to address XXX10 or XXX11. However, even if locations XXX11 and XXX01 contain exactly the same information, they cannot be shared, i.e., two locations have to be used even for the same contents. This is because both addresses are odd and the only pairing allowed is for odd/even addresses. In another prior art technique, a no-hit condition could be made to cause the addressing of the location specified by the control store word and a hit condition could cause the addressing of a location specified by the higher order address bits with the two lowest order bits, for example, both being binary ones. In this manner, an address whose two lowest order bits were both binary ones, could be paired with addresses whose two lowest ordered bits were either two binary zeros or a binary one and a binary zero (in either order). However this restricted the common address to an address which had its two lowest ordered bits binary ones (or vice versa, i.e., two binary zeros with appropriate change of the other paired addresses to one whose two lowest ordered bits are either both binary ones or a binary one and a binary zero).

In a data processing unit which allows a variety of sources to generate or form the next address for the control store, the use of the arrangement as shown in the Figures, more specifically FIGS. 5 and 8, is desirable. More particularly, the logic shown in such Figures allows a reduction in the total number of firmware or control store locations by allowing all locations to be used as alternates to an increased number of selected locations. In order to accomplish this, the least significant bit position (NA10) is coupled so that for the X0 branch, NA10 is in fact the same as the NA10 bit, NA(a), received from register 82 for the current control store word, whereas, for the X1 branch, the complement of such bit NA(A), is used.

Figure 9:
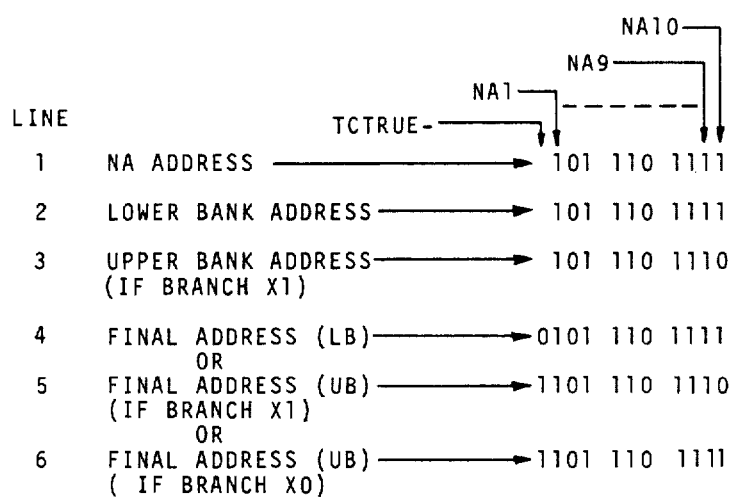
FIG. 9 illustrates an example of the operation of pairing locations in the control store included in the central processing unit of FIG. 2.

By way of example, FIG. 9 should be referenced. If the NA address is as shown on the first line, then the lower bank address is, as shown, the same. The upper bank address is however dependent upon whether there is an X0 or X1 branch. If an X1 branch, then the upper bank address is shown in the third line. The final address depends upon whether the signal TCTRUE− is a binary zero or one. If a binary zero, then the lower bank PROMs will be enabled. Thus, a shown in the fourth line, the final address will be for the lower bank if TCTRUE− is a binary zero. If TCTRUE− is a binary one, then the final address will be for the upper bank and depending upon whether the branch is X1 or X0, the final address will be as shown in lines 5 and 6 respectively of FIG. 9. More particularly, it can be seen that the lower bank address on line 4 may be paired with either of the addresses for the upper bank as shown on lines 5 and 6.

In this manner, more efficient pairing of locations may be obtained. Variations of the example shown in FIG. 9 will illustrate that an even address location of the lower bank may be paired with an even or odd address location of the upper bank, and that an odd address location of the lower bank may also be paired with either an even or odd address location in the upper bank.

It can be seen that the above described pairing could be accomplished by setting the binary value of the NA10 bit independent of the binary value of the NA10 bit of the current firmware word. For example, the NA10 bit for the X0 branch may have been set to a binary one instead of NA(A), so long as the NA10 bit for the X1 branch is its complement, in this case, a binary zero.

2. Interfacing Device Overview

The interfacing device resides within the dashed portion 10 of FIG. 2. The purpose of the interfacing device is to transfer procedural data words and non-procedural data words from the local bus 9 to the source bus 33. Procedure words are not only instruction words but can also include both data and addresses. Non-procedural data words are anything that are not procedural. As above described, the procedural data words and non-procedural data words are transferred from the source bus 33 to the inner bus 14 within the central processing unit (CPU) 16.

The interfacing device not only transfers the procedural data words and non-procedural data words but provides a two or three word pool of procedural data words which are ready in advance of requests by the CPU 80 so that when another word of procedural data is required, it is immediately available without necessitating another request to the system memory (or cache) over the local bus.

In general terms, the procedural data words and non-procedural data words comprise either part of a 24-bit address or a 16-bit data word. The 24-bit addresses and 16-bit data words are the two operands which are transferred within the system and any operand larger than 24 bits, e.g., a 32-bit operand, is assembled out of two 16-bit procedural data words or non-procedural data words.

The source bus 33 (FIG. 2) is 24 bits wide and conveniently transfers of 24-bit address. Addresses are provided to the source bus 33 by enabling 24 bits through the drivers DA 34 or the drivers PA 39 to the source bus 33. If only a word of 16 bits is required by the source bus, then the 16 right-hand bits of the source bus, bits 16-31, are driven by the drivers DW 35 or PW 40 and the eight left-hand bits of the source bus, that is, bits 8-15, are allowed to float or to take otherwise specified values.

FIG. 10 is a more detailed illustration of the interfacing device 10 shown in FIG. 2. As shown in FIG. 10, the data buffer latch 401 receives a 32-bit word data from the local bus 9. Data word register 403 is 16 bits wide and is coupled to receive the left-hand 16 bits of a non-procedural data word received in the data buffer latch 401. The data address register 405 is 24 bits wide and is coupled to the data bus latch 401 to receive the 24 bits of a non-procedural data word address. The OR gate 407 is coupled to the data word register 403 and the data address register 405 to transfer either the 16 bits of the data word register 403 to the source bus or the right hand 16 bits of the data address register 405 to the source bus. The bits transferred through OR gate 407 comprise bits 16-31 of the source bus.

Procedural data words include instructions for controlling the central processor unit 16 and are transferred from the data bus latch 401 to the prefetch buffer 409. The prefetch buffer 409 comprises a round-robin store with a capacity of four 16-bit procedural data words denoted storage locations A, B, C, and D. The OR gates 411 and 413 transfer the 16-bit procedural data words from the prefetch buffer 409 to the procedural data multiplexer 415. The procedural data multiplexer 415 has an input capacity of 48 bits and an output capacity of 24 bits and, thus, can generate either a 16-bit procedural data word or a 24-bit procedural data address from any combination of the procedural data words stored in storage locations A–D of the prefetch buffer 409. When the procedural data multiplexer 415 generates a procedural data word, it is supplied to bits 16–31 of the source bus by OR gate 407. When a procedural data address is generated, the right-hand 16 bits of the address are transferred to the source bus from the multiplexer 415 by the OR gate 407 and simultaneously the left-hand 8 bits are transferred from the multiplexer 415 to the source bus by the OR gate 417.

If the data received by the data bus latch 401 is procedural data, then it is transferred into the appropriate word storage location of the prefetch buffer 409. When a procedural data word is requested by the central processor unit, the appropriate outputs of the prefetch buffer 409, i.e., word storage locations A, B, C, or D, are enabled to the OR gates 411 and 413 to selected inputs of the multiplexer 415 and to the source bus via OR gates 417 and 407.

Before discussing in detail the sequence of control for accomplishing such transfer, the method by which the prefetch buffer 409 is loaded and unloaded will be considered. As stated above, the prefetch buffer 409 contains four words of procedural data and since 32 bits or two words are supplied to the data buffer latch 401 from the local bus, then two words are loaded into the prefetch buffer 409 at a time. Initially, word storage locations A and B are loaded and then, if A and B contain useful procedural data, the next two words of procedural data are loaded into storage locations C and D. No more procedural data words will be requested by the processor unit until words stored in A and B have been transferred via the source bus. Then word storage locations A and B will be reloaded and locations C and D will be transferred next.

As shown in FIG. 10, the loading of the prefetch buffer 409 is controlled by ABLOOK or CDLOOK. The unloading of the procedural data word stored in the prefetch buffer 409 is controlled by the signals BCNEXT+, CDNEXT+, BCNEXT−, and CDNEXT−. If the processor unit is requesting a procedural data word, the procedural data multiplexer 415 enables one of the 16-bit word storage locations A–D to the source bus under the control of the signals SEL-WAC and CRBUS4. The transfer of a non-procedural data word from the data word register 403 to the source bus via OR gate 407 is enabled by the presence of the signals DWTOSB. Similarly, the transfer of a non-procedural data address is enabled from the data address register 405 to the source bus via OR gates 407 and 417 when the signal is supplied to the data address register 405.

If the control store 80 requests a word of procedural data, then a single word N is enabled via the procedural data word multiplexer 415 to the source bus 33. If the control store 80 requests a procedural data address, then the word N and the next word N+1 will be enabled to the procedural data multiplexer for the generation of a 24-bit procedural data address. Thus, the procedural data multiplexer 415 can controllably supply individual procedural data words from locations A, B, C, or D to the source bus via OR gate 407. If the procedural data multiplexer is to generate a 24-bit procedural data address, then the address can be formed from the combination of words stored in locations AB, BC, CD, and DA. This means that the storage locations A, B, C, and D must be selectively enabled either to the 16 right-hand bits or the 8 left-hand bits of the procedural data multiplexer 415.

FIGS. 11A and 11B summarize the values for BCNEXT, CDNEXT, SELWAC and CRBUS4 which result in the formation of either a procedural data address or a procedural data word in the procedural data multiplexer 415. Considering first the procedural data multiplexer 415, the value of SELWAC controls whether data is placed in the right-hand 16 bits of the procedural data multiplexer or the left-hand 8 bits of the procedural data multiplexer. When SELWAC is true, i.e., equal to 1, bits transferred via OR gate 411 from the prefetch buffer 409 will be placed in the left-hand 8 bits of the procedural data multiplexer 415 and bits transferred via OR gate 413 will be enabled into the right-hand 16 bits of the procedural data multiplexer 415. Conversely, if SELWAC is false, i.e., equal to 0, then the output of OR gate 413 is enabled into the left-hand eight bits of the procedural data multiplexer 415 and the output of OR gate 411 is enabled into the right-hand 16 bits of the procedural data multiplexer 415.

The signals BCNEXT and CDNEXT control which of the storage locations A, B, C, or D, are to transfer procedural data words to procedural data multiplexer 415 via the OR gates 411 and 413. The transfer of a procedural data word from locations A or C is enabled when BCNEXT has a value of 0 or 1, respectively. The transfer of a procedural data word from locations B or D is enabled when CDNEXT has a value of 0 or 1, respectively.

FIG. 11A illustrates in truth table form the transfer of the procedural data words from locations A–D through the OR gates 411, 413 to the procedural data multiplexer 415. When BCNEXT and CDNEXT are both 0, then a procedural data word in location A is the NEXT word to be transferred and a procedural data word stored in location B is the NEXT+1 word to be transferred. These transfers take place over OR gates 413 and 411, respectively. In case 2, BCNEXT has a value of 1 and CDNEXT has a value of 0, indicating the transfer of procedural data words from locations B and C via OR gates 411 and 413, respectively. In case 3, BCNEXT AND CDNEXT both have a value of 1, indicating the transfer of procedural data words stored in locations C and D via OR gates 413 and 411, respectively. The final case, case 4, represents the situation when BCNEXT is 0 and CDNEXT is 1, indicating the transfer of procedural data words stored in locations D and A via OR gates 411 and 413, respectively.

FIG. 11B summarizes the location within the procedural data multiplexer 415, i.e., the right-hand 16 bits R or the left-hand 8 bits L, into which the procedural data words stored in locations A-D in the prefetch buffer 409 will be transferred. This table summarizes the relationship among BCNEXT, CDNEXT, and CRBUS4 and the transfer of procedural data words from the prefetch buffer 409 into the procedural data multiplexer 415. When CRBUS4 is equal to 0 and BCNEXT and CDNEXT have the values of case 1 in FIG. 7a, then SELWAC equals 1 and the procedural data word stored in location A is transferred into the right-hand 16 bits of the procedural data multiplexer 415 and the procedural data word stored in location B is transferred into the left-hand 8 bits of the procedural data multiplexer 415. Thus, the 8 left-hand (most significant) bits of the 16-bit procedural data word from location B are truncated during the transfer into the procedural data multiplexer 415.

When CRBUS4 is equal to 1 and the values of BCNEXT and CDNEXT are as indicated in case No. 1 of FIG. 11A, then SELWAC is equal to 0 and the procedural data word stored in location A is transferred into the left-hand 8 bits of the procedural data multiplexer 415 and the procedural data word stored in location B is transferred into the right-hand 16 bits of the procedural data multiplexer 415. The remaining combinations in the truth table of FIG. 11B are self-explanatory to one of ordinary skill in the art in view of these two discussed examples.

Figure 12:
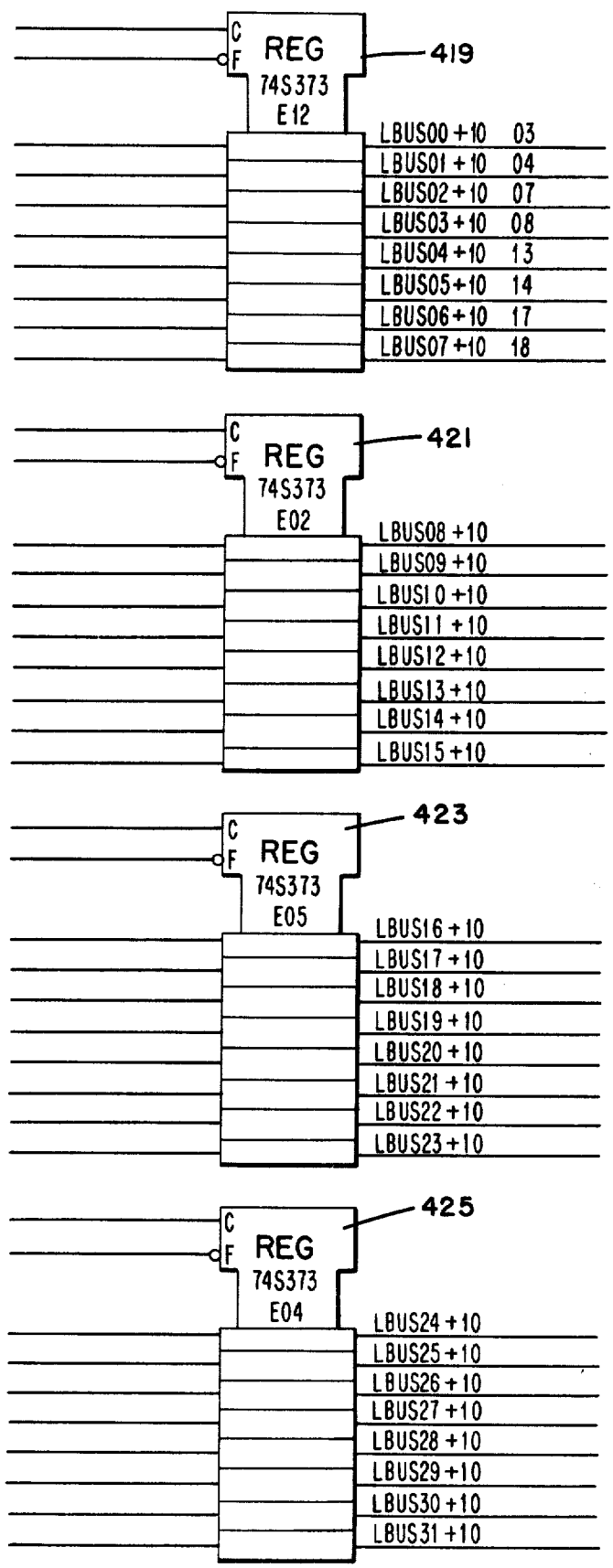
FIG. 12 illustrates a hardware embodiment of the data buffer latch shown in FIG. 10.

FIGS. 12–21 illustrate specific logic circuit diagrams for the interfacing device shown in block diagram form in FIG. 10. FIG. 12 shows a hardware embodiment of the data buffer latch 401 as comprising four identical registers 419, 421, 423, and 425 commercially available under the designation 74S373. The inputs to these registers comprise the 32 bits of the two words received from the local bus. On output, these 32 bits are designated LBUS00-LBUS31.

Figure 13:
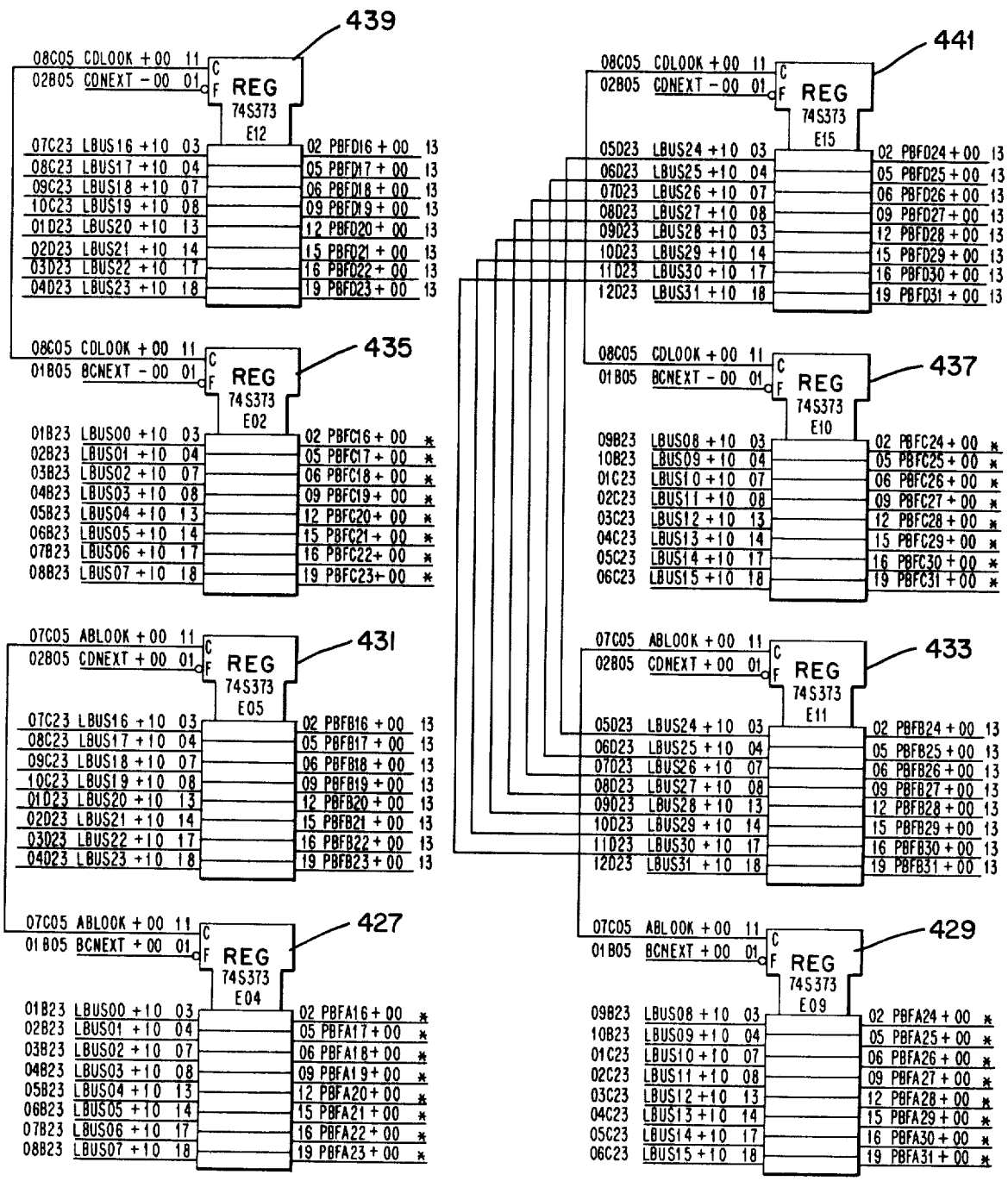
FIG. 13 illustrates a hardware embodiment of the prefetch buffer shown in FIG. 10.

FIG. 13 illustrates the hardware circuit elements included within the prefetch buffer 409. The procedural data word storage location A is implemented by the registers 427 and 409 receiving as inputs the signals LBUS00-LBUS15 and providing as outputs PBFA16-PBFA31. Similarly, the procedural data word storage location B in the prefetch buffer 409 is implemented by the registers 431 and 433 receiving as inputs LBUS16-LBUS31 and generating as outputs PBFB16-BPFB31. As seen from FIG. 12, the registers 427, 429, 431, and 433 are controlled by the signals ABLOOK, BCNEXT, and CDNEXT.

The procedural data word storage location C in the prefetch buffer 409 is implemented by the registers 435 and 437 receiving as inputs LBUS00-LBUS16 and generating as outputs PBFC16-PBFC31. Similarly, the procedural data word storage location D of the prefetch buffer 409 is embodied by registers 439 and 441 receiving as inputs LBUS16-LBUS31 and generating as outputs PBFD16-PBFD31. The registers 435, 437, 439, and 441 are controlled by the signals BCNEXT, CDNEXT, and CDLOOK.

FIG. 14 illustrates a hardware embodiment of the OR gate 413 connecting the procedural data word storage locations A and C in the prefetch buffer 409 to the procedural data multiplexer 415. In essence, the OR gate 413 comprises 16 OR gates combining the outputs of the registers 427 and 429 with the outputs of the registers 435 and 437. As an example, one of the OR gates is shown to generate the signal PBAC16 by logically ORing PBFA16 with PBFC16. The OR gates shown in FIG. 14 pass through either procedural data word stored in location A or procedural data word stored in location C in accordance with the value of BCNEXT. As summarized in table 11A, PBAC16 will equal PBFA16 when BCNEXT is 0 and will equal PBFC16 when BCNEXT is 1.

The OR gate 411 is embodied by a similar group of 16 OR gates as shown in FIG. 14. The inputs to the OR gates will be the bits of the procedural data words stored in locations B and D, i.e., PBFB16-PBFB31 and PBFD16-PBFD31. The signals PBBD16-PBBD31 are generated by OR gate 411.

Figure 15:
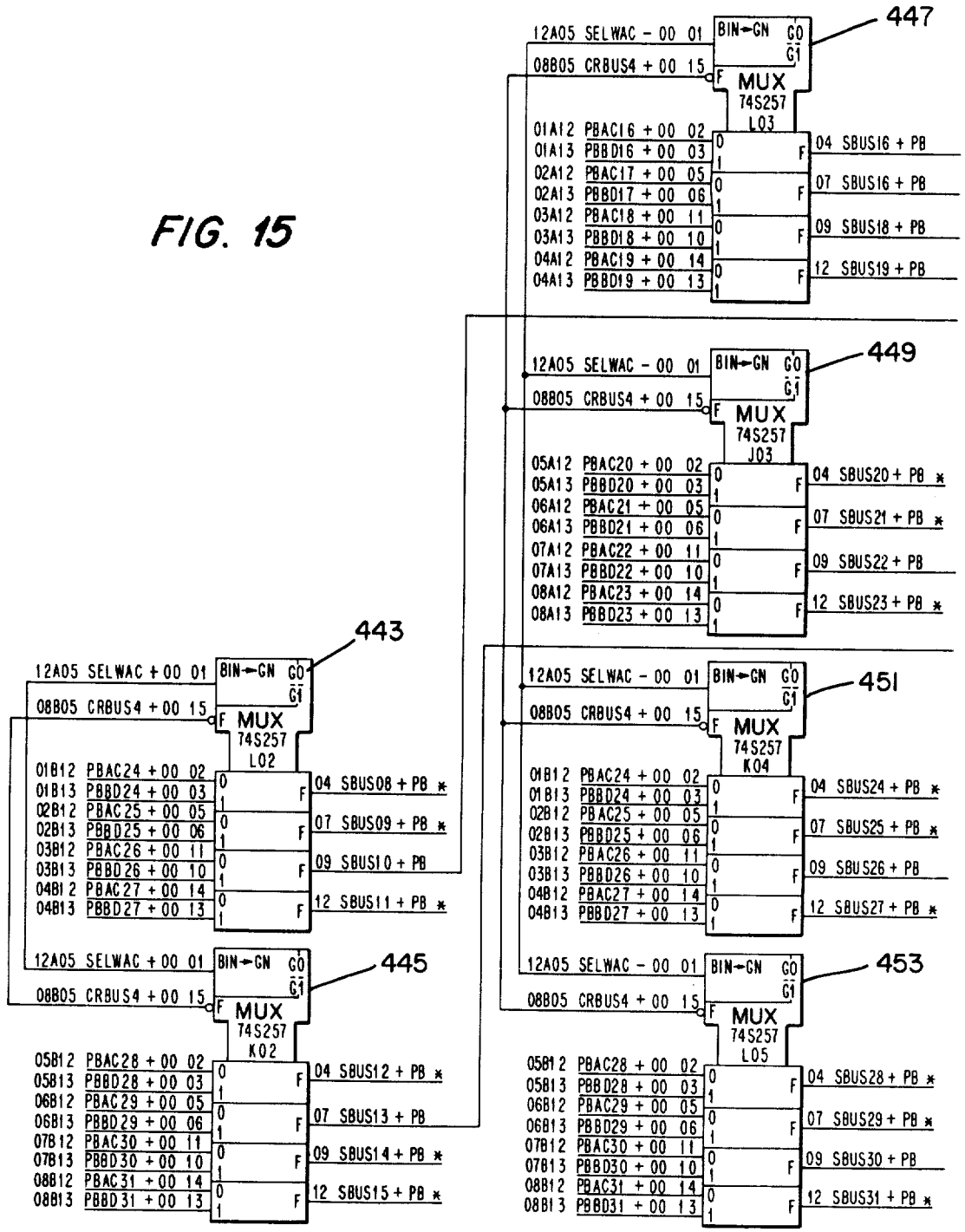
FIG. 15 illustrates a hardware embodiment of the procedure multiplexer of the interfacing device shown in FIG. 10.

FIG. 15 illustrates a hardware embodiment of the procedural data multiplexer 415. The multiplexer 415 comprises 6 commonly available multiplexer circuits (identified by the commercially-understood designation 74S257) connected in parallel. Thus, the multiplexer circuits 443-453 are connected in parallel receiving as inputs the outputs of the OR gates 411 and 413. Multiplexer circuits 443 and 445 generate the left-hand 8 bits outputted from the multiplexer whereas the multiplexer circuits 447, 449, 451, and 453 generate the right-hand 16 bits outputted from the procedure multiplexer.

As an example, multiplexer circuit 443 generates SBUS08 by selecting either PBAC24 or PBBD24 under the control of SELWAC and CRBUS4. It will be apparent to one of ordinary skill in the art what outputs will be generated by the multiplexer circuits 443-453 depending upon the values of SELWAC and CRBUS4 set forth in FIG. 11B. In sum, when a procedural data word is requested, the output signals SBUS16-SBUS31 will be generated by the multiplexer circuits 447, 449, 451, and 453. However, when a procedural data address is requested, a full 24 bits, i.e., SBUS08-SBUS31 will be generated by the combination of the multiplexer circuits 443-453.

Figure 16:
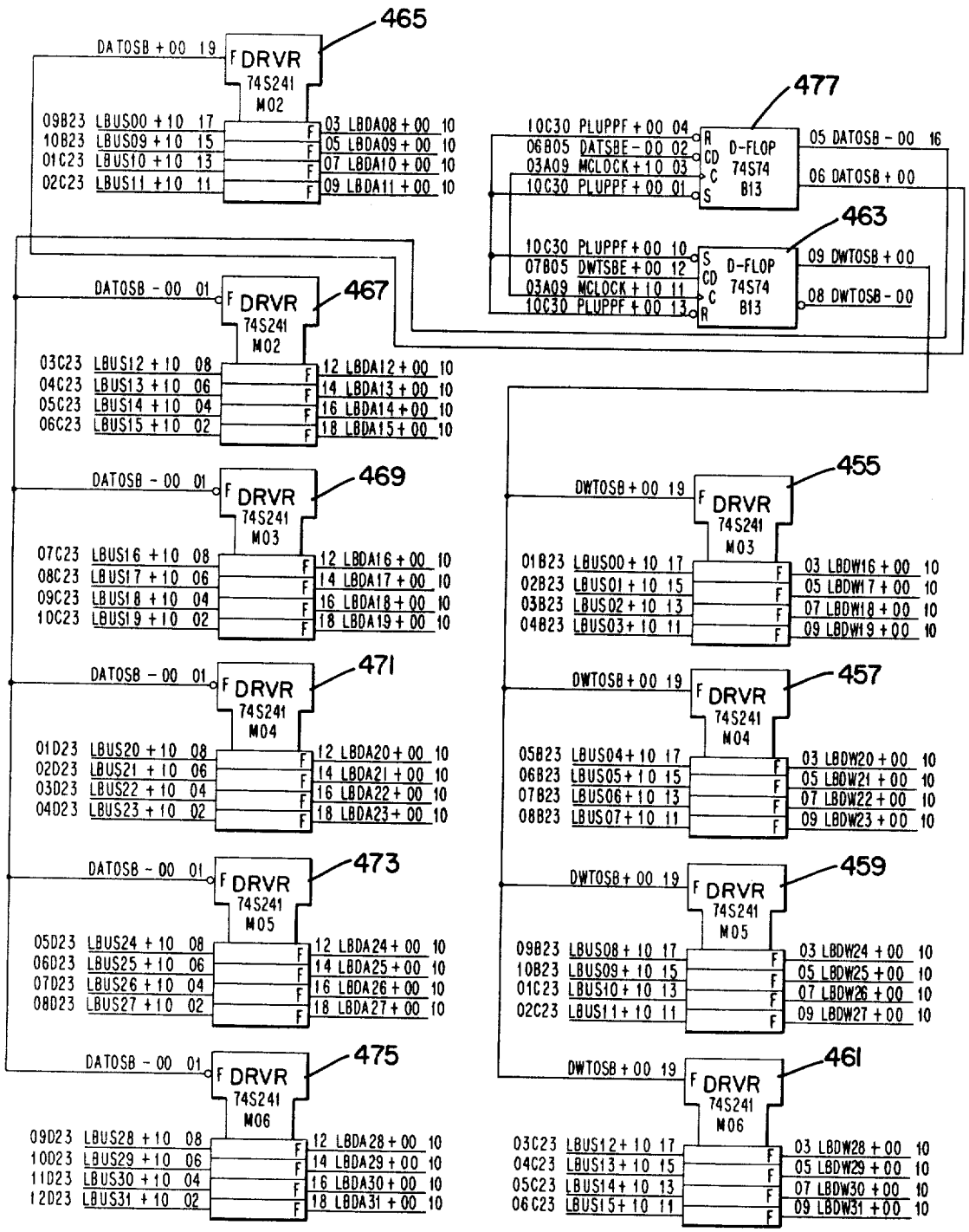
FIG. 16 illustrates hardware embodiments of the non-procedure data word register and data address register of the interfacing device shown in FIG. 10.

FIG. 16 shows hardware embodiments of suitable circuitry for the non-procedural data word register 403 and the non-procedural data address register 405. The non-procedural data word register 403 is comprised of four driver circuits 455, 457, 459, and 461. These driver circuits are commercially identified by the designation 74S241 and each driver circuit receives four inputs and generates four outputs. As an example, driver circuit 455 receives as inputs LBOSB0-LBOS03 and generates outputs LBDW16-LBDW19.

The transfer of the non-procedural data words through the drivers 455-461 is controlled by a D flip-flop 463 which generates the output signifying a non-procedural data word to the source bus, i.e., DWTOSB. The D flip-flop 463 receives as inputs the system clock MCLOCK, the pullup signal PLUPFF supplying a high value to the R and S inputs of the D flip-flop, and the DWTSBE signifying an enable for a non-procedural data word to be transferred to the source bus.

Driver circuits 465, 467, 469, 471 and 473 comprise the non-procedural address register 405. These driver circuits are connected in parallel to receive 24 inputs LBUS-08-LBUS31 and generate 24 outputs LBDA08-LBDA31. The D flip-flop 477 generates a signal signifying a data address to source bus DATA0SB whenever the system clock MCLOCK and the enable signal DATSBE toggle the flip-flop. As will be further explained, the enable signals DATOSBE and DWTOSBE are generated in accordance with the local bus field of the firmware instructions.

Figure 17:
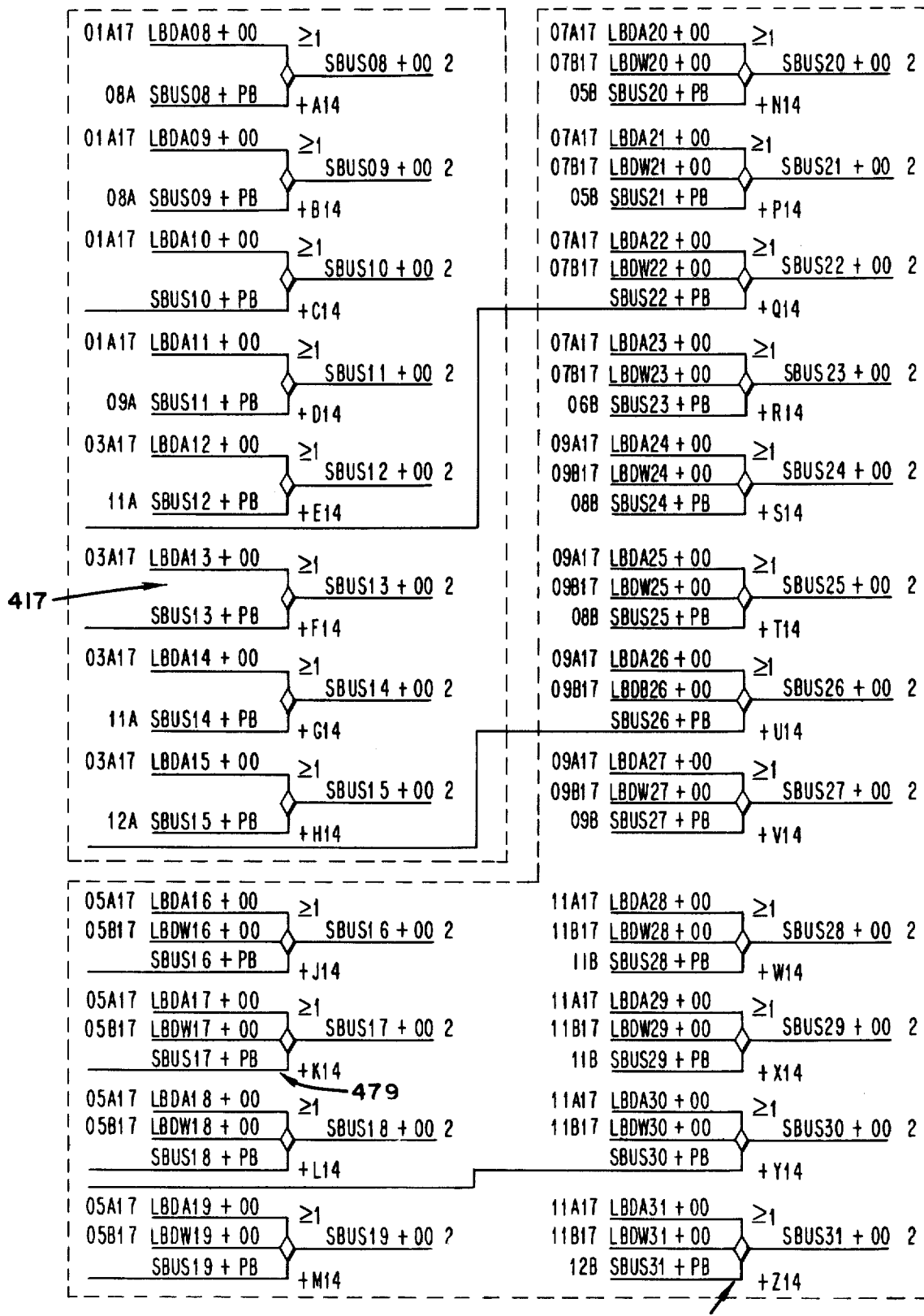
FIG. 17 illustrates hardware embodiments of another set of OR gates of the interfacing device of FIG. 10.

FIG. 17 illustrates hardware embodiments of the OR circuits 407 and 417. The OR circuit 407 is comprised of sixteen three input OR gates receiving as inputs the LBDA, LBDW, SBUS signals and generating as outputs the final signals to be transferred to the source bus, SBUS. As an example, the OR gate 479 receives the signals LBDA17 from the address register 405, LBDW17 from the data word register 403, and SBUS17 from the procedural data multiplexer 415 and generates the output signal SBUS17.

Similarly, the OR gate 417 comprises eight two input OR gate circuits receiving LBDA08-LBDA15 from the non-procedural address register 405 and SBUS08-SBUS15 from the procedural data multiplexer 415. The outputs of these eight OR gates are SBUS08-SBUS15 corresponding to the leftmost eight bits of either a procedural or non-procedural address.

Figure 18A:
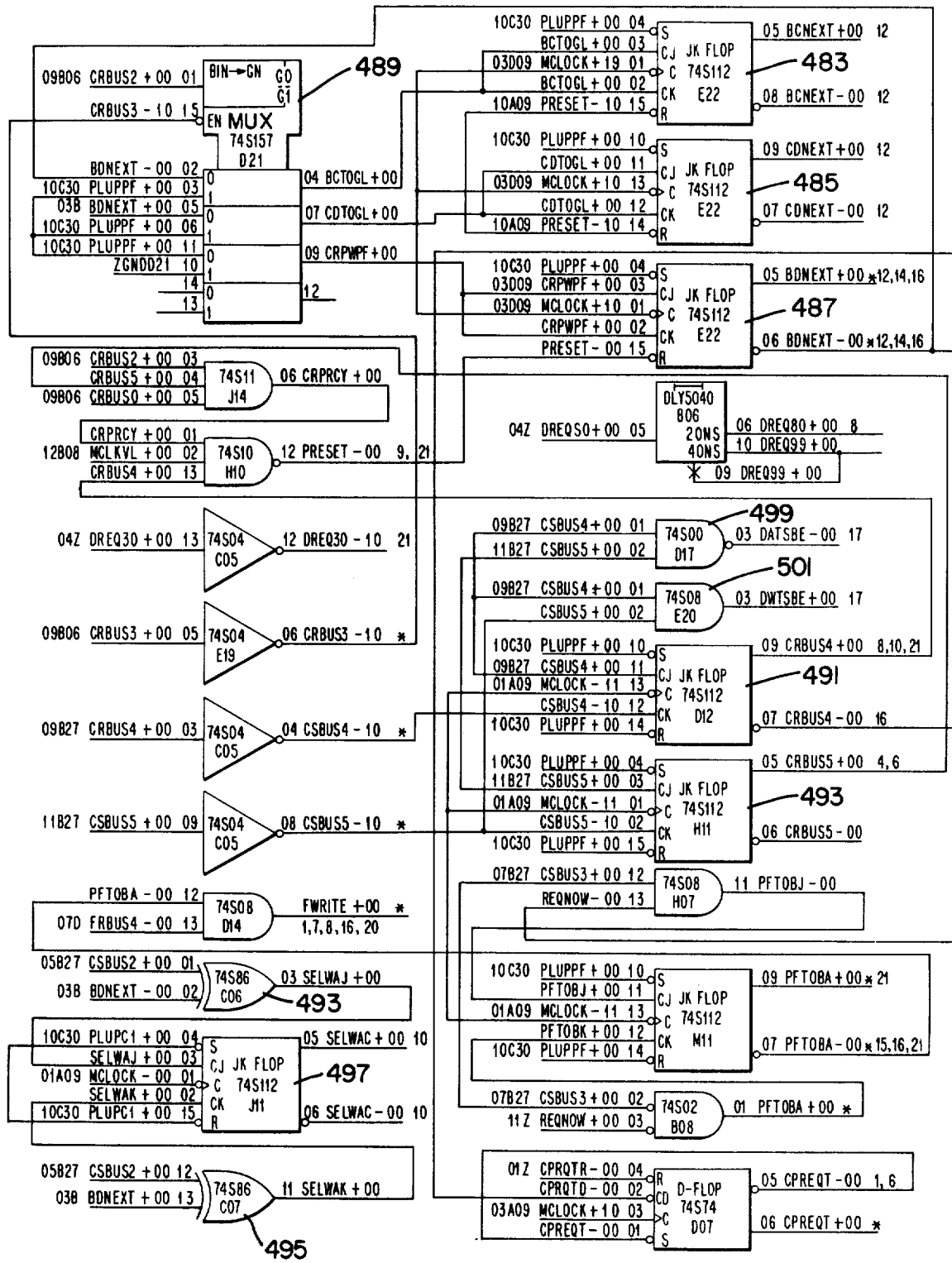
FIGS. 18A and 18B illustrate a hardware embodiment of circuitry for controlling the loading of procedure data words into the prefetch buffer of the interfacing device of FIG. 10.
Figure 18B:
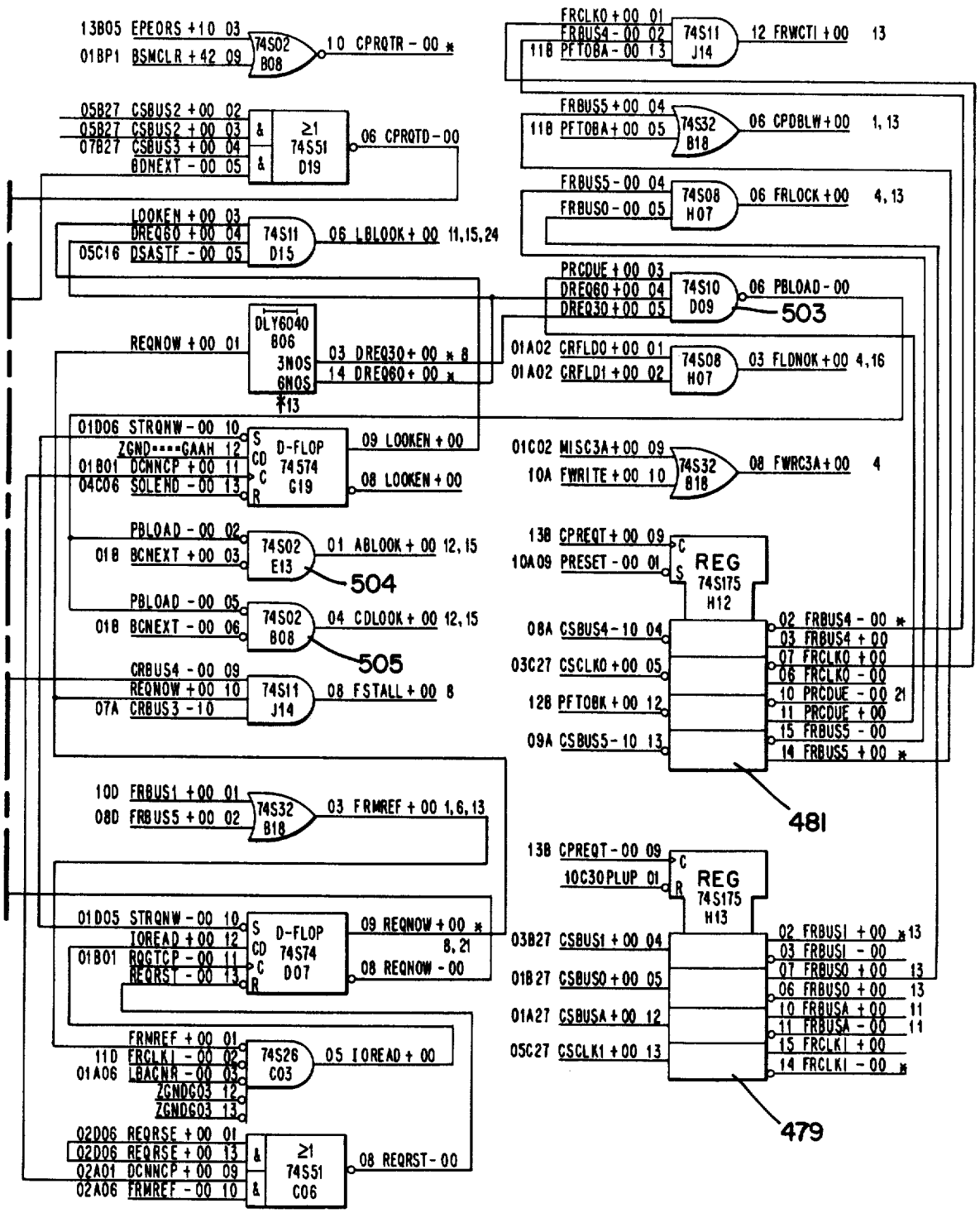

FIGS. 18A and 18B illustrate an example of a hardware circuit for generating the control signals ABLOOK, CDLOOK, BCNEXT, and CDNEXT employed to control the prefetch buffer 409 in the manner illustrated by the truth tables of FIGS. 11A and 11B.

As previously mentioned, a request for procedural data words or non-procedural data words is intitiated by the control store executing a firmware instruction. The LB field of the firmware instruction supplies the necessary control signals for generating a request of procedural data words or non-procedural data words from the cache/MMU and for controlling the interface device to properly transfer the fetched procedural data words or nonprocedural data words from the local bus to the source bus. Certain of the signals shown in FIGS. 18A and 18B are set by the firmware instructions as would be apparent to one of ordinary skill in the art. The precise manner in which these signals are supplied form no part of the instant invention and, therefore, the explanation of the control of the prefetch buffer 409 will assume the presence of the proper firmware-generated control signals.

Initially upon a request for procedural data words or non-procedural data words words by the central processor unit, the values of certain control store generated signals are stored in register 479 and 481. Thus, the signals CRBUS1, CRBUS0, and CSBUSA are enabled into register 479 by the presence of a request from the central processor indicated by the control signal CPREQT. Depending upon the values of the input control store signals, the values FRBUS0, FRBUS1, FRBUSA and FRCLK1 will be set high or low. In the same manner, register 481 stores the values of certain other control store signals at the time that a request for procedural data words or non-procedural data words is initiated by the central processor unit. The inputs to register 303 comprise CSBUS4, CSCLK0, PFT0BK, and CSBUS5 with the corresponding outputs being FRBUS4, FRCLK0, PRCDUE, and FRBUS5. The input signal PFTOBK indicates that either procedural data words or a procedural data address stored in the prefetch buffer 409 is to be transferred to the source bus. The mnemonic PRCDUE generated according to the value of PFTOBK indicates that a procedural data word is due to be transferred to the S bus.

The JK flip-flops 483, 485, and 487 (FIG. 14A) generate the prefetch buffer control signals BCNEXT, CDNEXT, and BDNEXT. The flip-flops receive as inputs BCTOGL, CDTOGL and CRPWPF generated by the multiplexer 489. BCTOGL controls flip-flop 483 to generate the BCNEXT signal and CDTOGL controls flip-flop 485 to generate the signal CDNEXT. A third output from the multiplexer 489 is CRPWPF indicating a control register procedural data word prefetch operation is to be performed. CRPWPF is supplied to flip-flop 487 to control the generation of the signal BDNEXT which is supplied as a feedback signal to multiplexer 489. Thus, the flip-flops 483 and 485 operate with the multiplexer 489 in the manner illustrated in FIG. 14A to generate values for BCNEXT and CDNEXT in response to control signals originating from the local bus field of a firmware word executed by the control store.

The JK flip-flops 491 and 493 directly translate the values of control store signals CSBUS4 and CSBUS5 to equivalent signals CRBUS4 and CRBUS5 for internal use within the interfacing device. In essence, CRBUS4 and CRBUS5 reflect the values of CSBUS4 and CSBUS5 set by the control store through the LB field of a firmware word. The OR gates 493 and 495 connected to JK flip-flop 497 control the generation of the signal SELWAK employed to control the loading of the procedural data multiplexer 415. The OR gate 493 combines the value of BDNEXT and CSBUS2 to generate the signal SELWAJ supplied to the J input of the flip-flop 497. Similarly, OR gate 495 generates SELWAK from CSBUS2 and BDNEXT and supplies it to the K input of flip-flop 497. SELWAC is set to either 0 or 1 as indicated by SELWAC+ and SELWAC−, respectively.

The AND gates 499 and 501 generate the signals DATSBE, DWTSBE, respectively, for enabling the generation of the signals DATOSB and DWTOSB as previously explained.

Considering now FIG. 18B, NAND gate 503 generates an output PBLOAD whenever procedural data words are to be loaded into the prefetch buffer 409. PBLOAD is determined by the values of PRCDUE indicating that procedural data words are to be loaded into the prefetch buffer and signals DREQ60 and DREQ30 coinciding to a request for procedural data words.

The AND gates 504 and 505 generate the values of ABLOOK and CDLOOK which, as previously explained, control the loading of procedural data words into storage locations A-D in the prefetch buffer 409, ABLOOK is generated according to the value of PBLOAD and BCNEXT whereas CDLOOK reflects the value of PBLOAD and BCNEXT.

FIGS. 18A and 18B contain numerous other circuit elements not specifically discussed herein but which are used internally by the interfacing device in cooperation with the discussed elements to control the loading and unloading of procedural data words into and out of the prefetch buffer 409. The function of these internal circuit elements and the nature of the cooperations between the elements would be apparent to one of ordinary skill in the art.

FIGS. 19A, 19B, 20A, and 20B illustrate circuitry for monitoring the status and condition of data received by the interfacing device from the local bus and transferred to the source bus. Whenever procedural data words or non-procedural data words are transferred either from the cache memory or the system memory by the local bus to the interfacing device, it is important that any signals generated to indicate the condition of the transferred data be simultaneously transferred along with the data. In other words, if a procedural data word is fetched from the cache memory but a parity error is detected in the transferred word, an indication of the occurrence of the parity error must be supplied to the source bus at the same time that the word is transferred to the source bus. This insures that the processor unit receiving the transferred word will be aware of the parity error therein.

The circuitry shown in FIGS. 19A, 19B, 20A and 20B checks for a number of different status signals transferred by the local bus along with the data. As mentioned above, one of these status signals reflects an improper recovery of data from either the cache memory or the system memory. This is commonly known as a parity error and is labeled a RED condition with the interfacing device. As an example, the cache memory or system memory could be an error detecting and correcting memory (EDAC) able to correct single bit errors in recovered data words and to detect the occurrence of double bit errors in a recovered data word. If a double bit error is detected in a memory word recovered from the system memory or cache memory, then the RED line is set true or equal to one.

If the cache memory cannot access a word because the address supplied to it is not physically installed in the system, a signal is generated indicating that the word is not available. The system requires, in such an instance, that the cache memory send back a responsse signal in order to unlock the system clock and, at the same time, the cache indicates via UAR (unavailable resource) the the word requested is unavailable.

It is commonly known that certain restrictions can be placed on the accessing of words stored in a memory. For example, a particular word may be designated not to be subject under certain conditions to a READ operation, a WRITE operation, or an execute instruction. If a memory request to either the cache memory or the system memory is made for a word stored therein and the operation to be performed on the accessed word is in violation of a protection designation for that word, then a protection violation PROV signal is returned via the local bus.

Another condition is also checked for in the data returned by the local bus. This condition is for eight bits of leading zeros whenever an address of twenty-four bits is to be produced from the 32 bits of information transferred to the data latch from the cache memory or system memory over the local bus. Thus, whenever a procedural data address or a non-procedural data address is to be assembled from words stored in the prefetch buffer 409 or the data address register 405, respectively, the left-hand eight bits, i.e., bits 0-7, of the word supplying the bits 0-7 to be transferred along the source bus with the address will be checked for zeros.

As discussed above in the description of the operation of the prefetch buffer 409 and the procedural data multiplexer 415, a procedural data address can be assembled from words AB, BC, CD, and DA of the prefetch buffer 409. If words AB make an address, then the left-hand eight bits of word A must be checked for zeros. Thus, besides checking for a double bit parity error, an unavailable resource, and a protection violation, the interfacing device will check for leading zeros in the appropriate portions of words as they are received from the local bus.

Finally, as stated above the nature of CRC memory is that single bit parity errors can be corrected. Whenever a request is made from memory (cache or system) and the memory detects and corrects a single bit parity error and transfers the corrected word to the interfacing device via the local bus, a signal YELO will accompany the transferred data so that it will be properly marked as having a corrected single bit parity error.

Figure 19A:
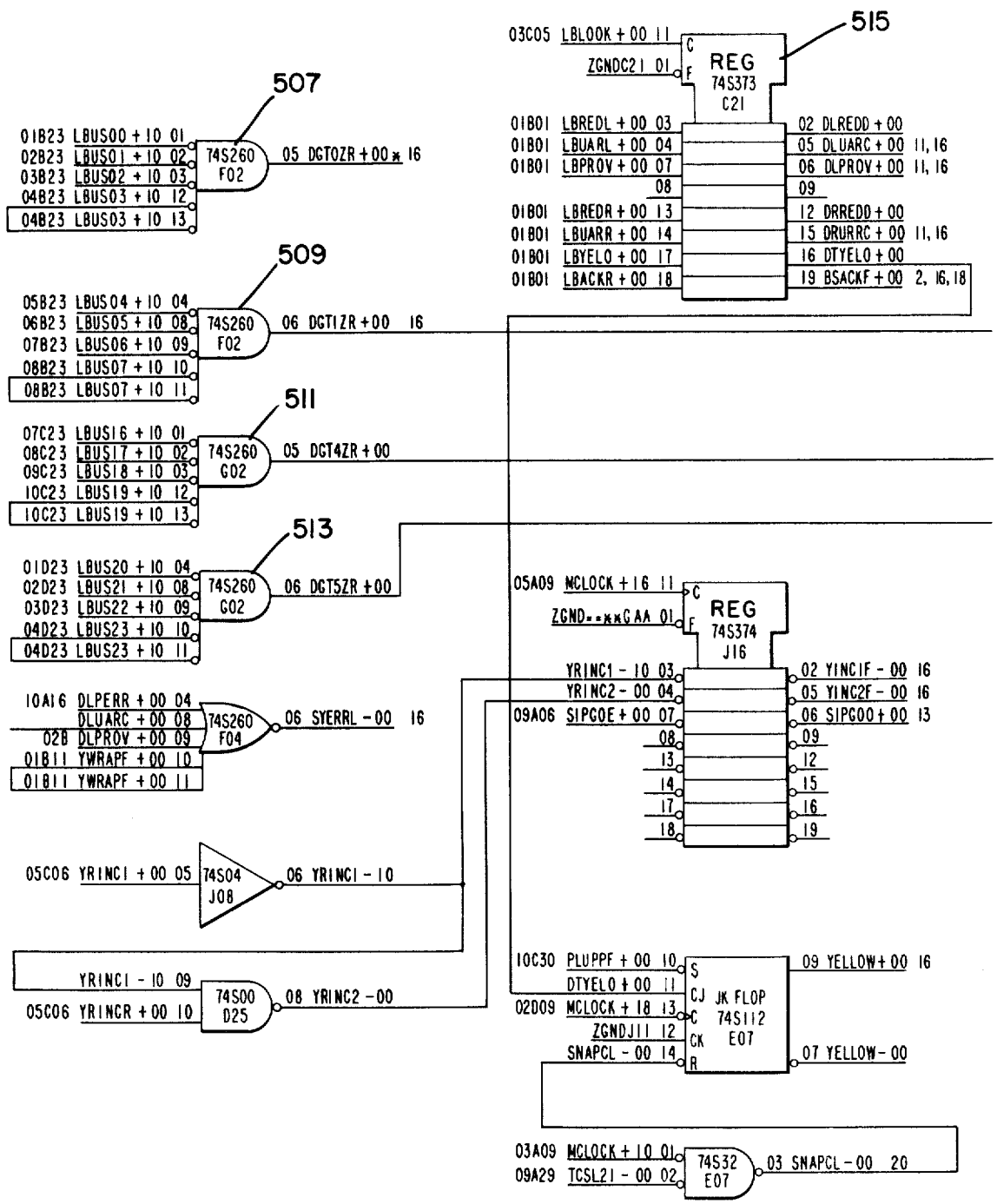
FIGS. 19A and 19B illustrate hardware embodiments of circuitry for checking the status of procedural data words and non-procedural data words transferred to the interfacing device shown in FIG. 10.
Figure 19B:
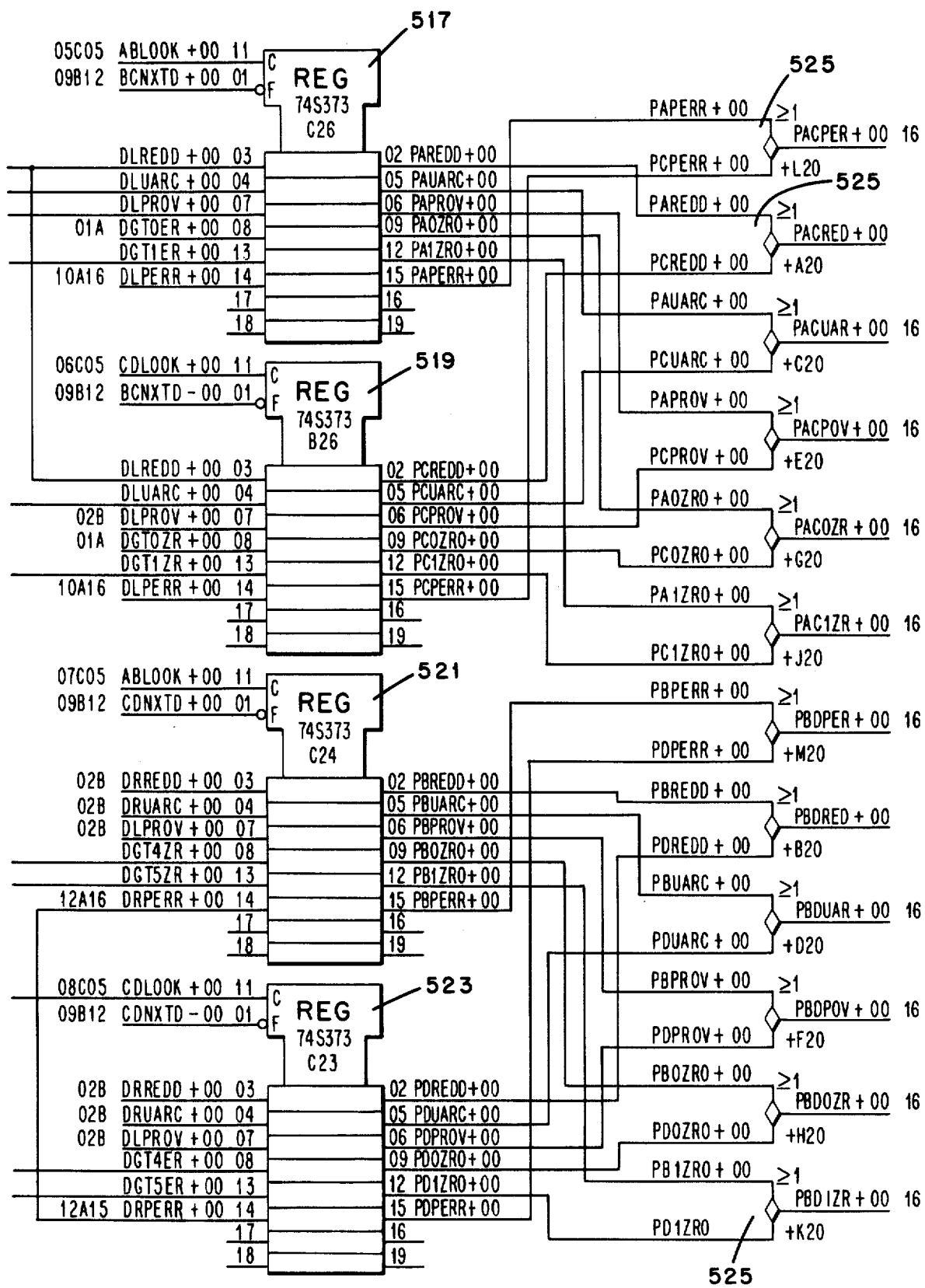

The circuitry for associating the status information transferred via the local bus along with transferred procedural data words and non-procedural data words is illustrated in FIGS. 19A and 19B. The 4 AND gates 507, 509, 511, and 513 perform the zero detection on the data received via the local bus. As mentioned above, the local bus always transfers two words of data to the data bus latch 401. Thus, the left-hand eight bits of each of the data words must be checked for zeros. The four input AND gates 507 and 509 receive LBUS00-LBUS03 and LBUS04-LBUS07, respectively, and generate outputs DGT0ZR and DGT1ZR whenever the received four bits are all zeros. Similarly, AND gates 511 and 513 receive LBUS16-LBUS19 and LBUS2- 0-LBUS23, respectively, and generate DGT4ZR and DGT5ZR in accordance with the received values. In essence, AND gates 507 and 509 always check for leading zeros in the first eight-bit positions of the procedural data words to be loaded into word locations A and C of the prefetch buffer 409. The AND gates 511 and 513 check for leading zeros in the first eight bits of the procedural data words to be loaded into locations B and D in the prefetch buffer 409.

Also, the status information transferred over the local bus along with the procedural data words is latched into register 515. The status signals are labeled LBREDL, LBUARL, LBPROV, LBREDR, LBUARR, LBYELO, and LBACKR. LBREDL and LBREDR signify the occurrence of a double bit parity error in the transferred words. LBUARL and LBUARR indicate that an unavailable address was requested in a fetch operation to either the cache or system memories. LBYELO indicates the occurrence of a corrected single bit parity error, LBPROV indicates the violation of a designated protection status of a particular requested memory location, and LBACKR corresponds to a completed (acknowledged) transfer of the data over the local bus to the data bus latch 401.

The outputs of register 515 convey identical status information as that received but the signal mnemonics are prefaced with DL instead of LB.

Since the procedural data words transferred over the local bus to the data bus latches 401 are selectively transferred into word storage positions A-D of the prefetch buffer 409, four registers, 517, 519, 521, and 523 are provided to store the status information associated with the procedural data word currently stored in each of the storage locations A-D.

The register 517 stores the status information associated with a procedural data word stored in word location A of the prefetch buffer 409. The word is latched into register 517 under the control of ABLOOK and BDNXTD such that the transfer of a procedural data word into storage location A of the prefetch buffer 409 results in the transfer of the associated status information for that procedural data word into the register 517.

The registers 519, 521, and 523 are similarly provided for storage locations C, B, and D, respectively.

Corresponding outputs of the registers 517 and 519 are coupled to OR gates 525 to provide the outputs PACPER, PACRED, PACUAR, PACPOV, PAC0ZR, PAC1ZR, PBDPER, PBDRED, PBDUAR, PBDPOV, PBD0ZR, and PBD1ZR. The transfer of the status information from the registers 517, 519, 521 and 523 to the proper OR gates 525 are controlled by the signals ABLOOK, BCNXTD; CDLOOK, BCNXTD; ABLOOK, CDNXTD; and CDLOOK, CDNXTD. Thus, the transfer of particular procedural data words into storage locations A-D in the prefetch buffer 409 and from buffer 409 through the OR gates 411 and 413 to the procedural data multiplexer 415 is paralleled by a similar transfer of the status information from the register 515 through selected registers 517-523 and to the OR gates 525.

The generation of the signals BCNXTD, CDNXTD, and BDNXTD is accomplished by register 421 carrying the commercial identification 74S175 (FIG. 21). The values of BCNEXT, CDNEXT, and BDNEXT control the generation of the output signals BCNXTD, CDNETD, and BDNXTD.

Figure 20A:
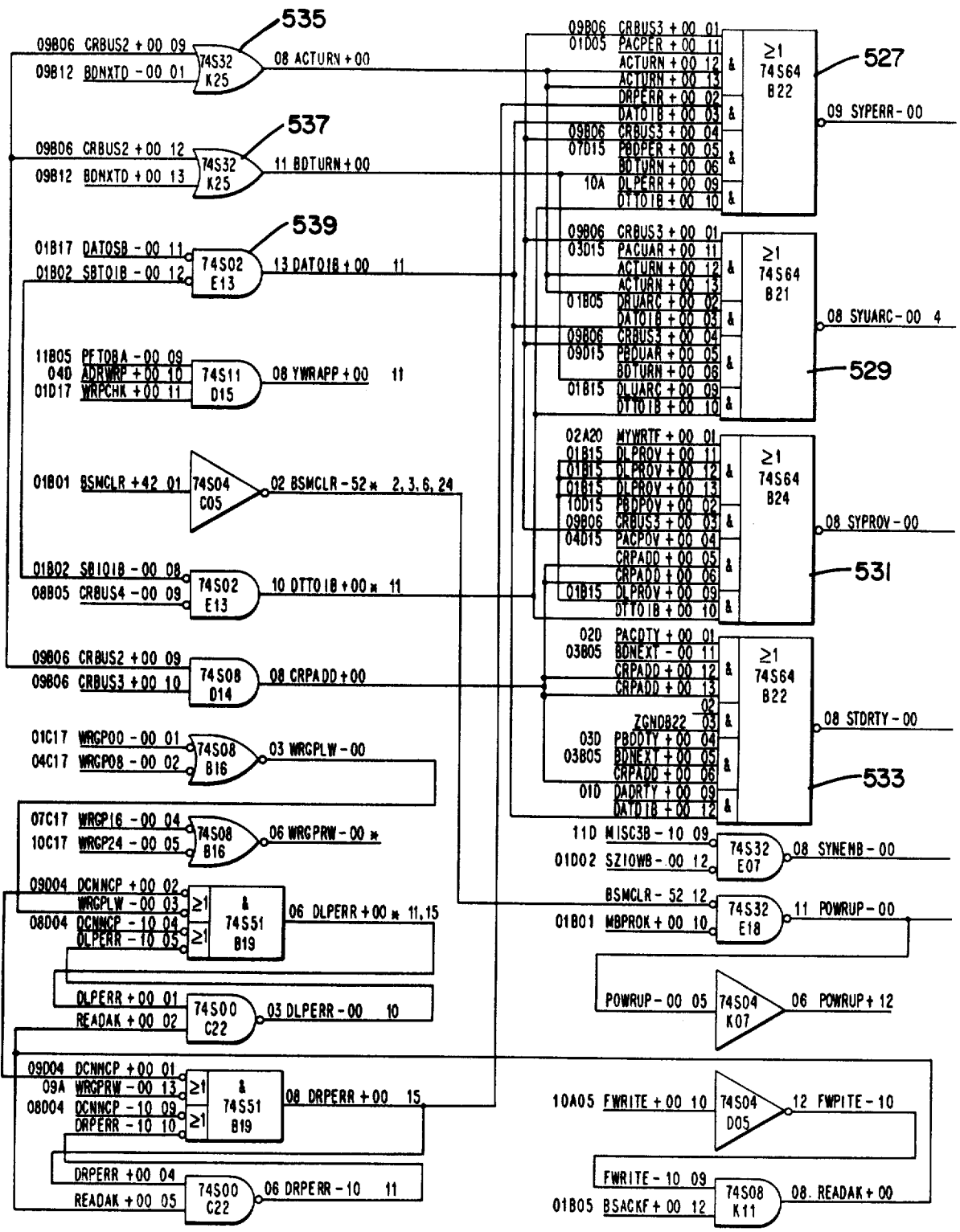
FIGS. 20A and 20B illustrate a hardware embodiment of circuitry for transferring status data associated with the procedural data words and non-procedural data words transferred by the interfacing device to the source bus.
Figure 20B:
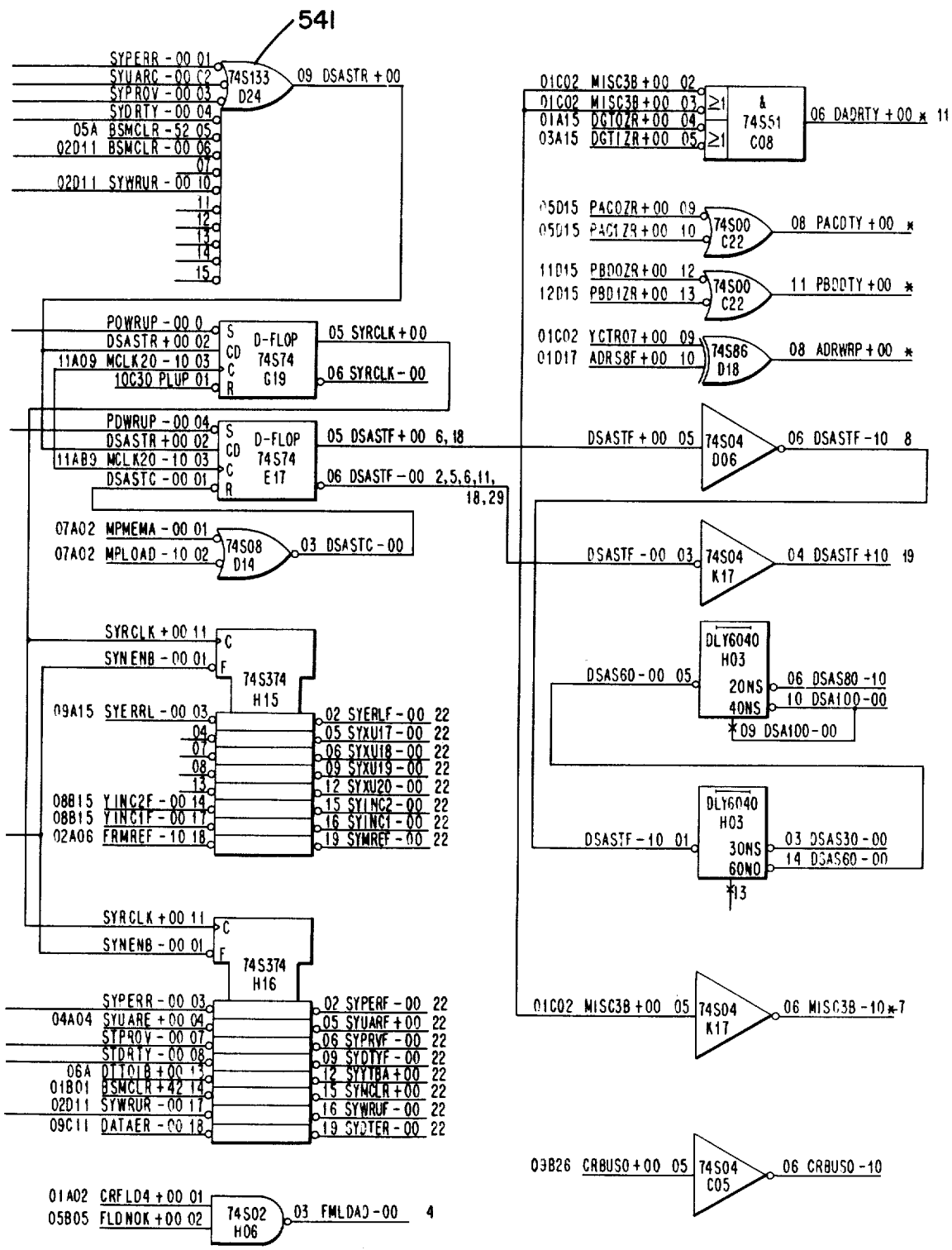

FIGS. 20A and 20B illustrate the circuitry for collecting the outputs of the OR gates 525 (FIG. 19B) and transmitting the outputs to the processor unit via the syndrome bus. The combination AND/OR gates 527, 529, 531, and 533 combine the outputs of the OR gates 525 to generate signals SYPERR, SYUARC, SYPROD, and SYDRTY, indicating the occurrence of a parity error, request for an unavailable resource, a protection violation, and a corrected single bit parity error, respectively. The OR gates 535 and 537 control the loading of the status data for procedural words stored in locations A, C, and B, D, respectively into the AND-/OR circuits 527-533. The AND gate 539 controls the transfer of the data from the AND/OR gates 527-533 to the syndrome bus by the generated signal DATOIB (data address to inner bus) which is the logical combination of DATOSB (data address to source bus) and SBTOIB (source bus to inner bus).

Whenever the outputs of the AND/OR circuits 527-533 indicate the occurrence of a parity error, request for an unavailable resource, a protection violation, or a corrected single bit parity error, an input is supplied to OR gate 541 to generate the signal DSASTR and to force a branch to a known firmware location within the control store 80 to handle the detected error.

In operation, the interfacing device performs the transfer of procedural data words and non-procedural data words received from either the system memory 106 or the cache/MMU 103 over the local bus 9. Such transfers are initiated by firmware instructions stored in the upper and lower banks of the control store 80 and executed by the processor unit. The local bus field LB of the firmware instructions provide controlling signals for transferring the data through the interfacing device.

The local bus transfers 32 bits (2 words) of procedural data or non-procedural data to the data bus latch 401. From there, non-procedural data words are transferred to the sixteen bit data word register 403 and 24-bit non-procedural data addresses are transferred to the data address register 405. When the words in the data bus latch 401 are procedure data, they are transferred into storage locations AC, or BD, in the prefetch buffer 409. Each of the storage locations A-D are suitable for storing 1 sixteen-bit word of procedural data.

Either a sixteen-bit procedural data word or a 24-bit procedural data address is formed in the procedural data multiplexer 415 by the selective transfers of the procedural data words stored in the word storage locations A-D of the prefetch buffer 409 via the OR gates 411 and 413. The procedural data words selected by the procedural data multiplexer can be the contents of any of the storage locations A, B, C or D.

A procedural data address formed in the procedural data multiplexer 415 comprises the combination of word storage locations AB, BC, CD, or DA. The OR gate 407 is provided to either transfer a sixteen-bit non-procedural data word from the data word register 403 or a sixteen-bit procedural data word from the procedural data multiplexer 415 to the source bus. The OR gate 407 also transfers the right most sixteen bits of the non-procedural data address from the data address register 405 to the source bus or the right-hand sixteen bits of a procedural data address from the right-hand sixteen bits of the procedural data multiplexer 415. The left-hand eight bits of a non-procedural data address are transferred to the source bus through the OR gate 417 as are the left-hand eight bits of a procedural data address transferred to the source bus from the procedural data multiplexer.

The transfer of status information associated with either the procedural data words or non-procedural data words transferred from the data bus latch 401 to the source bus by the interfacing device accompanies the transferred procedural data words or non-procedural data words. The status information indicates whether a procedural data word or non-procedural word transferred via the local bus to the data bus latch 401 included a parity error, a corrected parity error, or included leading zeros in proper circumstances. The status information also indicates whether a request has been made for an address unavailable in the cache or system memory or whether a request has been made that violates the protected status of a requested memory location.

It will be apparent, to those skilled in the art, that modifications and variations can be made in the exemplary interfacing device disclosed herein without departing from the scope or spirit of the invention. Thus, it is intended that the present invention includes these modifications and variations of this invention which come within the scope of the appended claims and their equivalents.

What is claimed is:

1. An interfacing system for controlling the transfer of procedural data words, procedural data addresses, non-procedural data words, and non-procedural data addresses from a system memory to a processor unit in response to a request by the processor unit for the procedural data words, procedural data addresses, non-procedural data words, and non-procedural data addressed said system comprising:

means for receiving said procedural data words, said procedural data addresses, said non-procedural data words, and said non-procedural data addresses transferred from said system memory in response to a processor request;

means coupled to said receiving means for storing said received procedural data words and procedural data addresses separately from said received non-procedural data words and non-procedural data addresses; and means for selectively transferring to said processor unit said procedural data words, said procedural data addresses, said non-procedural data words, or said non-procedural data address stored in said storing means.

2. An interfacing system according to claim 1 wherein said receiving means comprises a data latch.

3. An interfacing system according to claim 2 wherein said storing means comprises:

a first storing means for storing said non-procedural data words and said non-procedural data addresses, said first storing means including (1) a data word buffer for storing a non-procedural data word, and (2) a data address buffer for storing a non-procedural data address;

second storing means for storing said procedural data words and said procedural data addresses, said second storing means including (1) a plurality of data word storage cells, each of said data word storage cells for storing a different one of said procedural data words and procedural data addresses, (2) a procedural data multiplexer for receiving one or more of said procedural data words or procedural data addresses stored in said plurality of data storage cells, and (3) OR gate means for selectively transferring procedural data words and procedural data addresses from said data storage cells to said procedural data multiplexer; and means for controlling the transfer of said non-procedural data words from said data latch to said data word buffer, said non-procedural data addresses from said data latch to said data address buffer, and said procedural data words and said procedural data addresses from said data latch to said data storage cells.

4. An interfacing system according to claim 2 wherein said transferring means comprises a source bus coupled to said processor unit and OR gate transferring means for transferring said non-procedural data words from said data word buffer to said source bus, said non-procedural data addresses from said data address buffer to said source bus, and said procedural data words and said procedural data addresses from said procedural data multiplexer to said source bus.

5. An interfacing system according to claim 4 wherein said procedural data words, said procedural data addresses, said non-procedural data words, and said non-procedural data addresses transferred from said system memory and received by said data latch have associated therewith status data indicating the occurrence of (1) a corrected or uncorrected parity error, (2) a request by said processor unit for a procedural data address or a non-procedural data address unavailable in said system memory, and (3) a request by said processor unit for a procedural data word or a non-procedural data word protected from a request by said processor unit, and wherein said interfacing system further includes status transferring means for simultaneously transferring the status data associated with a, a procedural data address, a procedural data word, a non-procedural data word, or a non-procedural data address transferred by said interfacing means from said system memory to said source bus.

6. An interfacing system according to claim 2 further including zero detector means for detecting the presence of leading zeros in selected procedural data words or non-procedural words received by said data latch from said system memory.

7. An interfacing system according to claim 6 wherein said processor unit includes a control store for storing firmware instructions including a local bus field, said processor unit for selectively accessing and executing said firmware instructions to generate control signals for controlling means for controlling the transfer of said requested procedural data words or non-procedural data words from said system memory to said processor unit, and wherein said controlling means comprises:

a first NAND gate for generating in response to the value of said local bus field a signal indicating that a procedural data word is to be loaded into said second storing means;

flip-flop means for generating a signal indicating which of said data storage cells in said second storing means is to receive a said procedural data word; and a first AND gate and a second AND gate, each said AND gate receiving the output of said NAND gate and said flip-flop means to generate first and second associated signals for initiating the loading of a procedural data word received by said data latch into a selected data storage cell of said second storing means.

8. An interfacing system according to claim 7 further including a second NAND gate and a third AND gate for generating a signal enabling the transfer from said data latch of a said non-procedural data word into said data word buffer and a said non-procedural data address into said data address buffer, respectively.

9. An interfacing system according to claim 7 wherein said status transferring means comprises:
- a first register means for receiving said status data associated with said received procedural data words and non-procedural data words;
- a plurality of second register means in one-to-one association with said plurality of data storage cells in said second storing means, each of said second register means for storing the status data corresponding to a procedural data word stored in said associated data storage cell; and
- means for accessing the status data stored in said plurality of second register means and for transferring to said processor unit first, second, third, and fourth error signals indicating the presence of a said corrected parity error, a said uncorrected parity error, a said request for a procedural data address or a non-procedural data address unavailable in said system memory, or an improper request for a protected procedural data word or non-procedural data word, respectively, in response to the transfer of said procedural data word, said procedural data address, said non-procedural data word, or said non-procedural data address associated with said indicated error to said processor unit.

10. In a data processing system wherein a processor unit requests procedural words and non-procedural words stored in a memory, accesses and executes firmware instructions stored in a control store to generate control signals for obtaining the requested words and a local bus transfers the requested procedural words and non-procedural words from the memory, an interfacing system for transferring to the processor unit the requested procedural words and non-procedural words transferred by said local bus, said interfacing system comprising;
- a data latch for receiving the procedural words and non-procedural words transferred by said local bus;
- a round robin procedural store for storing a plurality of procedural words received by said data latch, said round robin procedural store including a plurality of procedural word storage locations for storing said requested procedural words;
- a procedural data multiplexer for selectively generating a procedural data word or a procedural data address from said procedural words stored in said storage locations of said round robin procedural store;
- means for transferring said procedural words from said round robin procedural store to said procedural data multiplexer; and
- means for selectively providing to said central processor unit a said procedural data word or a said procedural data address generated by said procedural data multiplexer or a said non-procedural word stored in said data latch.

11. An interfacing system according to claim 10 wherein said procedural words and said non-procedural words are sixteen bits long, said procedural word addresses and said non-procedural word addresses are twenty-four bits long, each said storage location in said round robin procedural store has a storage capacity of sixteen bits, said procedural data multiplexer has as capacity of twenty-four bits, said data latch has a capacity of sixteen bits, said source bus has a capacity to transfer twenty-four bits in parallel to said processor unit, and wherein said providing means comprises:
- a first OR gate circuit means for (1) coupling a said procedural data word to said source bus by transferring the sixteen least significant bits of said procedural data multiplexer to the sixteen least significant bits of said source bus, and (2) coupling a non-procedural data word to said source bus by transferring the sixteen bits of said data latch to the sixteen least significant bits of said source bus; and
- a second OR gate circuit means cooperating with said first OR gate circuit means for transferring a said procedural data address or a said non-procedural data address to said source bus by (1) transferring the most significant eight bits of said procedural data multiplexer to the most significant eight bits of said source bus simultaneously with the transfer by said first OR gate circuit means of the least significant sixteen bits of said procedural data multiplexer to the least significant sixteen bits of said source bus, and (2) selectively transferring eight bits of said data latch to the eight most significant bits of said source bus simultaneously with the transfer by said first OR gate circuit means of the sixteen least significant bits of said data latch to the sixteen least significant bits of said source bus, respectively.

* * * * *